(12) United States Patent
Ahn et al.

(10) Patent No.: US 8,865,266 B2
(45) Date of Patent: Oct. 21, 2014

(54) METHOD OF COATING A POROUS SUBSTRATE

(75) Inventors: Dongchan Ahn, Midland, MI (US); Christopher Wong, Los Angeles, CA (US); Renee Berrie, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/985,311

(22) PCT Filed: Feb. 14, 2012

(86) PCT No.: PCT/US2012/024962
§ 371 (c)(1),
(2), (4) Date: Aug. 14, 2013

(87) PCT Pub. No.: WO2012/112483
PCT Pub. Date: Aug. 23, 2012

(65) Prior Publication Data
US 2013/0316087 A1    Nov. 28, 2013

Related U.S. Application Data

(60) Provisional application No. 61/443,462, filed on Feb. 16, 2011.

(51) Int. Cl.
| | | |
|---|---|---|
| *B05D 3/02* | (2006.01) | |
| *B05D 3/06* | (2006.01) | |
| *C08F 2/46* | (2006.01) | |
| *B01D 69/10* | (2006.01) | |
| *B05D 7/00* | (2006.01) | |

(52) U.S. Cl.
CPC ............... *B05D 7/52* (2013.01); *B01D 69/105* (2013.01); *B01D 2323/225* (2013.01)
USPC .................. 427/487; 427/270; 427/385.5

(58) Field of Classification Search
CPC ..... B01D 69/105; B01D 2325/02; B05D 7/52
USPC ........................ 427/270, 385.5, 487
See application file for complete search history.

(56) References Cited

U.S. PATENT DOCUMENTS

| | | | |
|---|---|---|---|
| 6,258,276 B1 | 7/2001 | Mika et al. | |
| 7,247,370 B2 | 7/2007 | Childs et al. | |
| 7,316,919 B2 | 1/2008 | Childs et al. | |
| 7,604,746 B2 | 10/2009 | Childs et al. | |
| 2006/0292345 A1* | 12/2006 | Dave et al. | .................... 428/141 |
| 2009/0130477 A1 | 5/2009 | Hou et al. | |

FOREIGN PATENT DOCUMENTS

| | | |
|---|---|---|
| GB | 2142556 A | 1/1985 |
| JP | 60171140 A | 9/1985 |
| KR | 1020140016283 A | 2/2014 |
| TW | 201235115 A | 9/2012 |
| WO | WO-2007/018423 A1 | 2/2007 |
| WO | WO-2012112483 A1 | 8/2012 |

OTHER PUBLICATIONS

"International Application Serial No. PCT/US2012/024962, Search Report mailed Apr. 19, 2012", 3 pgs.
"International Application Serial No. PCT/US2012/024962, Written Opinion mailed Apr. 19, 2012", 3 pgs.
Amano, Takao, et al., "Preparation of ultrafiltration membrane from polymer containing organoborane bond", Kagaku to Kogyo (Osaka, Japan), 65(3), (1991), 129-33.
Deng, Chao, et al., "Fabrication of thin composite palladium membranes: modification of porous ceramic substrate with gel", Nanjing Gongye Daxue Xuebao, Ziran Kexueban, 32(1), (2010), 92-97.
"International Application Serial No. PCT/US2012/024962, International Preliminary Report on Patentability mailed Aug. 29, 2013", 5 pgs.

* cited by examiner

*Primary Examiner* — Elena T Lightfoot
(74) *Attorney, Agent, or Firm* — Schwegman Lundberg & Woessner, P.A.

(57) ABSTRACT

The present invention relates to a method of coating a porous substrate. The method includes forming a first coating on the substrate that at least partially fills the pores of the substrate, forming a second coating on the substrate, and optionally at least partially restoring the porosity of the porous substrate.

13 Claims, No Drawings

METHOD OF COATING A POROUS SUBSTRATE

CROSS-REFERENCE TO RELATED APPLICATION

This application is a national stage application under 35 U.S.C. §371 of PCT/US2012/024962, filed Feb. 14, 2012, and published as WO 2012/112483 A1 on Aug. 23, 2012, which claims the benefit of priority of U.S. Provisional Patent Application No. 61/443,462, entitled "METHOD OF COATING A POROUS SUBSTRATE," which was filed on Feb. 16, 2011, which applications and publication are incorporated by reference as if reproduced herein and made a part hereof in their entirety, and the benefit of priority of each of which is claimed herein.

BACKGROUND OF THE INVENTION

Coating a porous surface evenly with a liquid can be problematic, due to the tendency of pores to absorb liquids. Coating can be especially troublesome with a liquid that needs to harden or cure. If the porous surface absorbs the coating material before or while it hardens or cures, the surface of the hardened coating material can have uneven thickness, and sometimes uneven coverage of the porous surface. The absorptive properties of pores are due to at least in part to capillary action of the pores, and sometimes also to surface tension of the liquid.

Artificial membranes can be used to perform separations on both a small and large scale, which makes them very useful in many settings. For example, membranes can be used to purify water, to cleanse blood during dialysis, and to separate gases. Some common driving forces used in membrane separations are pressure gradients and concentration gradients. Membranes can be made from polymeric structures, for example, and can have a variety of surface chemistries, structures, and production methods. Membranes can be made by hardening or curing a composition.

In some settings, it is necessary or desirable to form a membrane on a surface of a porous material. For example, industrial membranes are often prepared on porous or microporous supports. The support must be porous to allow permeation of the desired components through the membrane. However, due to the tendency of pores to absorb the composition before it hardens or cures, the resulting texture and thickness of the membrane produced after curing can be inconsistent, making the membrane inadequate for its intended purpose.

Masking the pores with an impermeable interlayer poses a problem with mask removal. Likewise, sealing the pores with wax or other higher viscosity materials makes it difficult to recover the porosity of the substrate after coating, particularly with small pores.

SUMMARY OF THE INVENTION

The present invention relates generally to a method of coating a porous substrate. The method is advantageous over other methods of coating porous substrates. The method provides a convenient, cost-effective manner to prepare coatings such as membranes on porous supports. The method allows the facile and substantial recovery of the porosity of the substrate after a coating process is complete.

The present invention provides a method of coating a porous substrate. The method includes providing a substrate. At least one surface of the substrate includes a plurality of pores. The method also includes forming a first coating. The first coating is formed on the at least one surface of the porous substrate. The first coating is formed sufficient to at least partially fill the pores of the at least one surface of the substrate with the first coating. The first coating includes a solvent-swollen polymer gel. The method also includes optionally removing the first coating from the at least one surface of the porous substrate. In some embodiments, the first coating is removed from the at least one surface of the porous substrate. In other embodiments, the first coating is not removed from the at least one surface of the porous substrate. The removal is sufficient to form a substantially exposed substrate surface. The substantially exposed substrate surface has the solvent-swollen polymer gel in the pores. The method also includes forming a second coating on the exposed substrate surface. The second coating includes a polymer, a silicate, any form of carbon, a metal, a ceramic, a metal organic framework, or a combination thereof. The method also includes drying the solvent-swollen polymer gel. The solvent-swollen polymer gel that is dried is in the pores of the at least one surface of the porous substrate.

The present invention has certain advantages over other methods of coating a porous substrate. In other techniques, masking the pores with an impermeable layer poses a problem with mask removal, which is a critical problem for applications that require the restoration of the porosity of the substrate after the coating process. Likewise, sealing the pores with wax or other higher viscosity materials can make it difficult to recover the porosity of the substrate after coating, particularly with small pores. The method is advantageous over other methods of coating porous substrates. The method allows the facile and substantial recovery of the porosity of the substrate after a coating process is complete. The method provides a convenient, cost-effective manner to prepare coatings such as membranes on porous supports.

In another embodiment, the present invention provides a method of coating a porous substrate. The method includes providing a substrate. At least one surface of the substrate includes a plurality of pores. The method also includes forming a first coating. The first coating is formed on the at least one surface of the porous substrate. The first coating is formed sufficient to at least partially fill the pores of the at least one surface of the substrate with the first coating. The first coating includes a solvent-swollen polymer gel. Forming the first coating includes applying the coating that forms the first coating. Forming the first coating further includes curing the coating that forms the first coating. The coating that forms the first coating is cured sufficiently to form the first coating. The coating that forms the first coating includes component (A). Component (A) of the coating that forms the first coating is a free-radical polymerizable compound or an organic polymer. The coating that forms the first coating further includes optional component (B). In some embodiments, Component (B) is present in the coating that forms the first coating. In other embodiments, component (B) is not present in the coating that forms the first coating. Optional component (B) of the coating that forms the first coating is an organoborane free-radical initiator. The coating that forms the first coating further includes component (C). Component (C) of the coating that forms the first coating is a solvent. The coating that forms the first coating optionally further includes component (D). Component (D) of the coating that forms the first coating is an organonitrogen-reactive compound. The coating that forms the first coating optionally further includes component (E). Component (E) of the coating that forms the first coating is a polymerizable co-monomer. When Component (A) of the coating that forms the first coating includes a free-radical polymerizable compound, Component (B) is present. The method also includes optionally removing the first coating from the at least one surface of the porous substrate. In some embodiments, the first coating is removed from the at least one surface of the porous substrate. In other embodiments, the first coating is not removed from the at least one surface of the porous substrate. The removal is sufficient to form a substantially exposed substrate surface. The substantially exposed substrate surface has the solvent-swollen polymer gel in the pores. The method also includes forming a second coating on the exposed substrate surface. The second coating includes a polymer or a silicate. Forming the second coating includes applying a coating that forms the second coating. Forming the second coating further includes curing the coating that forms the second coating. The coating that forms the second coating optionally includes component (A). Component (A) of the coating that forms the second coating is a free-radical polymerizable compound or an organic polymer. The coating that forms the second coating further optionally includes component (B). Component (B) of the coating that forms the second coating is an organoborane free-radical initiator. The coating that forms the second coating further optionally includes component (C). Component (C) of the coating that forms the second coating is a solvent. The coating that forms the second coating further optionally includes component (D). Component (D) of the coating that forms the second coating is an organonitrogen-reactive compound. The coating that forms the second coating further optionally includes component (E). Component (E) of the coating that forms the second coating is a polymerizable co-monomer. When Component (A) of the coating that forms the second coating is a free-radical polymerizable compound, Component (B) is present. The method also includes drying the solvent-swollen polymer gel. The solvent-swollen polymer gel that is dried is in the pores of the at least one surface of the porous substrate.

In another embodiment, the present invention provides a method of coating a porous substrate. The method includes providing a substrate. At least one surface of the substrate includes a plurality of pores. The method also includes forming a first coating. The first coating is formed on the at least one surface of the porous substrate. The first coating is formed sufficient to at least partially fill the pores of the at least one surface of the substrate with the first coating. The first coating includes a solvent-swollen polymer gel. Forming the first coating includes applying the coating that forms the first coating. Forming the first coating further includes curing the coating that forms the first coating. The coating that forms the first coating is cured sufficiently to form the first coating. The coating that forms the first coating includes component (A). Component (A) of the coating that forms the first coating is a free-radical polymerizable compound or an organic polymer. The coating that forms the first coating further includes optional Component (B). Optional Component (B) of the coating that forms the first coating is an organoborane free-radical initiator. The coating that forms the first coating further includes component (C). Component (C) of the coating that forms the first coating is a solvent. The coating that forms the first coating optionally further includes component (D). Component (D) of the coating that forms the first coating is an organonitrogen-reactive compound. The coating that forms the first coating optionally further includes component (E). Component (E) of the coating that forms the first coating is a polymerizable co-monomer. In embodiments in which Component (A) is a free-radical polymerizable compound, Component (B) is present. The method also includes optionally removing the first coating from the at least one surface of the porous substrate. In some embodiments, the first coating is removed from the at least one surface of the porous substrate. In other embodiments, the first coating is not removed from the at least one surface of the porous substrate. The removal is sufficient to form a substantially exposed substrate surface. The substantially exposed substrate surface has the solvent-swollen polymer gel in the pores. The method also includes forming a second coating on the exposed substrate surface. The second coating includes a polymer, a silicate, or a combination thereof. Forming the second coating on the exposed surface includes applying a coating that forms the second coating. Forming the second coating further includes cooling the coating that forms the second coating. The coating that forms the second coating is cooled sufficiently to form the second coating. The coating that forms the second coating includes at least one of a thermoplastic silicone polymer or a thermoplastic organic polymer. The method also includes drying the solvent-swollen polymer gel. The solvent-swollen polymer gel that is dried is in the pores of the at least one surface of the porous substrate.

In another embodiment, the present invention provides a method of coating a porous substrate. The method includes providing a substrate. At least one surface of the substrate includes a plurality of pores. The method also includes forming a first coating. The first coating is formed on the at least one surface of the porous substrate. The first coating is formed sufficient to at least partially fill the pores of the at least one surface of the substrate with the first coating. The first coating includes a solvent-swollen polymer gel. Forming the first coating includes applying the coating that forms the first coating. Forming the first coating further includes curing the coating that forms the first coating. The coating that forms the first coating is cured sufficiently to form the first coating. The coating that forms the first coating includes component (A). Component (A) of the coating that forms the first coating is a free-radical polymerizable compound or an organic polymer The coating that forms the first coating further includes optional Component (B). Optional Component (B) of the coating that forms the first coating is an organoborane free-radical initiator. The coating that forms the first coating further includes component (C). Component (C) of the coating that forms the first coating is a solvent. The coating that forms the first coating optionally further includes component (D). Component (D) of the coating that forms the first coating is an organonitrogen-reactive compound. The coating that forms the first coating optionally further includes component (E). Component (E) of the coating that forms the first coating is a polymerizable co-monomer. In embodiments in which Component (A) is a free-radical polymerizable compound, Component (B) is present. The method also includes optionally removing the first coating from the at least one surface of the porous substrate. In some embodiments, the first coating is removed from the at least one surface of the porous substrate. In other embodiments, the first coating is not removed from the at least one surface of the porous substrate. The removal is sufficient to form a substantially exposed substrate surface. The substantially exposed substrate surface has the solvent-swollen polymer gel in the pores. The method also includes forming a second coating on the exposed substrate surface. The second coating includes any form of carbon, a metal, ceramic, a metal organic framework, or a combination thereof. Forming the second coating on the exposed surface includes applying a coating that forms the second coating. Forming the second coating further includes forming the second coating from the coating that forms the second coating. The method also includes drying the solvent-swollen polymer gel. The solvent-swollen polymer gel that is dried is in the pores of the at least one surface of the porous substrate.

DETAILED DESCRIPTION OF THE INVENTION

Reference will now be made in detail to certain claims of the disclosed subject matter. While the disclosed subject matter will be described in conjunction with the enumerated claims, it will be understood that they are not intended to limit the disclosed subject matter to those claims. On the contrary, the disclosed subject matter is intended to cover all alternatives, modifications, and equivalents, which can be included within the scope of the presently disclosed subject matter as defined by the claims.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.1% to 0.5%, 1.1% to 2.2%, 3.3% to 4.4%) within the indicated range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The following documents are hereby incorporated by reference:
PCT/US10/053,112, U.S. provisional application No. 61/305,863, and WO2009/048694.

Definitions

The term "about" can allow for a degree of variability in a value or range; for example, within 10%, or within 5% of a stated value or of a stated limit of a range.

The term "independently selected from" refers to referenced groups being the same, different, or a mixture thereof, unless the context clearly indicates otherwise. Thus, under this definition, the phrase "$X^1$, $X^2$, and $X^3$ are independently selected from noble gases" can include the scenario where, for example. $X^1$, $X^2$, and $X^3$ are all the same, where $X^1$, $X^2$, and $X^3$ are all different, where $X^1$ and $X^2$ are the same but $X^3$ is different, and other analogous permutations.

The term "miscible fluid" refers to a polar or non-polar fluid that is sufficiently compatible with the cured polymer such that it can be absorbed as a diluent or is capable of acting as a solvent for Component (A). Examples of fluids suitable for polymer systems can be found in standard polymer handbooks, such as the Polymer Handbook, Third Edition, Edited by J. Brandrup and E. H. Immergut, John Wiley & Sons, Pages VII/379-382+(1989).

The term "plateau elastic shear modulus" refers to the median value of dynamic elastic shear modulus (G') in the region of the plot of G' vs. testing frequency where G' reaches a relatively constant value (or exhibits a "plateau") as determined, for example, by a small strain dynamic oscillatory shear experiment. One skilled in the art would know that appropriate strain values are dictated by the sensitivity of the particular rheometer, sampling geometry, and material chosen and can be any value of strain that falls within the small strain regime where G' is independent of strain, as determined for example by a strain sweep experiment. G' is a material function that is independent of method.

The term "viscosity" refers to the value of the real component of the complex viscosity ($\eta'$) measured with a rheometer. Examples of suitable rheometers include, but are not limited to, a Rheometrics RDA II parallel plate rheometer, using a small strain dynamic oscillatory shear experiment at an angular frequency of 10 rad/s; and a Brookfield DV-II+ rheometer with a Helipath attachment and T-D spindle (20.4 mm crossbar) at 2.5 rpm, following the manufacturer's recommended testing procedure and measuring at 25° C. $\eta'$ is a material function that is independent of method. For simple polymers and fluids, "viscosity" refers to an extrapolated zero shear viscosity as measured in a small strain dynamic oscillatory shearing experiment at shear rates low enough for $\eta'$ to be relatively independent of shear rate. For pastes, "viscosity" refers to the measured value of $\eta'$ at the stated frequency and strain rate.

The term "gel" refers to crosslinked polymers in which the crosslinked polymer matrix is fully or partially swollen with a solvent as defined below. To induce swelling of the gel, the solvent is can be a solvent for at least one phase of the polymer matrix prior to crosslinking. The crosslinking of the polymer matrix may be chemical or physical in nature. As non-limiting examples, the gel may be crosslinked through covalent bonds, ionic interactions, hydrogen bonding, chain entanglement, or self-association of microphase segregating moieties. Additionally, one of skill in the art will readily understand that such gels may exist and be used in a dried (unswollen) state.

The term "hydrogel" refers to gels in which the crosslinked polymer matrix is fully or partially swollen with water, one or more water-compatible alcohols, or combinations thereof. Accordingly, the term also includes, but is not limited to, alcogels fully or partially swollen with a water-compatible alcohol. The crosslinking of the polymer matrix may be chemical or physical in nature. As non-limiting examples, the hydrogel may be crosslinked through covalent bonds, ionic interactions, hydrogen bonding, chain entanglement, or self-association of microphase segregating moieties. Additionally, one of skill in the art will readily understand that such hydrogels may exist and be used in a dehydrated (unswollen) state.

The term "thermoplastic polymer" refers to a polymer that has the property of converting to a fluid (flowable) state when heated and of becoming rigid (nonflowable) when cooled.

Also, the term "thermoset polymer" refers to a cured (e.g., cross-linked) polymer that does not convert to a fluid state on heating.

The term "radiation" refers to energetic particles travelling through a medium or space. Examples of radiation are visible light, infrared light, microwaves, radio waves, very low frequency waves, extremely low frequency waves, thermal radiation (heat), and black-body radiation.

The term "thermoplastic polymer in a fluid state" refers to the polymer being in a molten state or dissolved in an organic solvent.

The term "cure" refers to exposing to radiation in any form, heating, or allowing to undergo a chemical reaction that results in hardening or an increase in viscosity. The term "cure" also can refer to physical processes that result in thickening, solidification or hardening of solution, such as solvent evaporation (such as drying of a latex paint or spin coating of a polymer solution), or cooling to induce coalescence or a phase transition within the coating, such as in a hot melt or thermoplastic elastomer.

The term "pore" refers to a depression, slit, or hole of any size or shape in a solid object. A pore can run all the way through an object or partially through the object. A pore can intersect other pores.

The term "frit" refers to any porous object. The porous object can be a ceramic composition that has been fused, quenched to form a glass, and granulated. The porous object can be a sintered, polycrystalline, unglazed material. The porous object can be a porous metal object. The porous object can be made of any suitable material. The porous object can be a porous polymer. The porous object can be a sheet or a fiber, or can have any suitable shape.

The term "epoxy-functional" or "epoxy-substituted" refers to an organic group in which an oxygen atom, the epoxy substituent, is directly attached to two adjacent carbon atoms of a carbon chain or ring system.

The term "solvent" refers to a liquid that can dissolve a solid, liquid, or gas. Nonlimiting examples of solvents are silicones, organic compounds, water, alcohols, ionic liquids, and supercritical fluids.

The term "coating" refers to a continuous or discontinuous layer of material on the coated surface, wherein the layer of material can penetrate the surface and can fill areas such as pores, wherein the layer of material can have any three-dimensional shape, including a flat or curved plane. In one example, a coating can be formed on one or more surfaces, any of which may be porous or nonporous, by immersion in a bath of cured or hardened coating material.

The term "surface" refers to a boundary or side of an object, wherein the boundary or side can have any perimeter shape and can have any three-dimensional shape, including flat, curved, or angular, wherein the boundary or side can be continuous or discontinuous. While the term surface generally refers to the outermost boundary of an object with no implied depth, when the term 'pores' is used in reference to a surface, it obviously refers to both the surface opening and the depth to which the pores extend beneath the surface into the substrate.

The term "organogel" refers to a gel swollen with a liquid that includes any organic liquid, including organopolysiloxanes, organosiloxanes, or any suitable organosilicon compound.

The term "hydrogel" refers to a gel swollen with a liquid that includes water.

The term "resin" as used herein refers to polysiloxane material of any viscosity that includes at least one siloxane monomer that is bonded via a Si—O—Si bond to three or four other siloxane monomers. In one example, the polysiloxane material includes T or Q groups, as defined herein.

Description

The present invention relates generally to methods of coating a porous substrate. The method includes providing a substrate. At least one surface of the substrate includes a plurality of pores. The method also includes forming a first coating. The first coating is formed on the at least one surface of the porous substrate. The first coating is formed sufficient to at least partially fill the pores of the at least one surface of the substrate with the first coating. The first coating includes a solvent-swollen polymer gel. The method also includes removing the first coating from the at least one surface of the porous substrate. The removal is sufficient to form a substantially exposed substrate surface. The substantially exposed substrate surface has the solvent-swollen polymer gel at least partially in the pores. The method also includes forming a second coating on the exposed substrate surface. The second coating includes a polymer or a silicate. The method also includes drying the solvent-swollen polymer gel. The solvent-swollen polymer gel that is dried is in the pores of the at least one surface of the porous substrate.

Providing a Substrate

The present invention can include the step of providing a substrate. At least one surface of the substrate includes a plurality of pores.

The at least one surface can be any surface of the porous substrate. The at least one surface can be flat, curved, or any combination thereof. The surface can have any perimeter shape. The porous substrate can have any number of surfaces, and can be any three-dimensional shape, including films, fibers and particles. The porous substrate can have any aspect ratio. Examples of three-dimensional shapes include sheets, discs, cubes, spheres, cones, cylinders, hollow-fibers, and planar sections thereof with any thickness, including variable thicknesses. The porous substrate can be woven or non-woven.

The porous substrate can have any number of pores, and the pores can be of any size, depth, shape, and distribution. In one example, the porous substrate has a pore size of from about $0.5 \times 10^{-9}$ m to about 1 m, alternately from about $2 \times 10^{-9}$ m to about $5 \times 10^{-3}$ m, alternately from about $10 \times 10^{-9}$ m to about $100 \times 10^{-6}$ m. The at least one surface can have any number of pores.

The porous substrate can comprise any material—nonlimiting examples include porous materials constructed of polymers, non-metals, metals, metalloids, ceramics or mixtures, blends, composites and alloys thereof. The materials can be synthetic, or can be naturally occurring or naturally-derived materials. Examples of synthetic polymers include any common thermoplastics and thermosetting materials. Examples of metals include aluminum, titanium, copper, steel and stainless steel. Examples of ceramics include any form of alumina, zirconia, titania, and silica. Examples of naturally occurring or naturally-derived materials include wood, wood composites, paper, cellulose acetate, and geological formations such as granite or limestone. Examples of non-metals include various forms of carbon such as graphite or carbon. Examples of metalloids include silicon or germanium. The porous material may also be a construction material such as concrete or asphalt.

Forming a First Coating

The present invention can include the step of forming a first coating. The first coating is formed on the at least one surface of the porous substrate. The first coating is formed sufficient to at least partially fill the pores of the at least one surface of the substrate with the first coating. The first coating includes a solvent-swollen polymer gel.

The porous substrate can include surfaces that are not coated by the step of forming a first coating. All surfaces of the porous substrate can be coated by the step of forming a first coating, one surface can be coated, or any number can be coated. In some embodiments, the step of forming a first coating can be performed on fewer surfaces than the step of forming the second coating. In some embodiments, the step of forming a first coating can be performed on the same surfaces as the step of forming the second coating. In some embodiments, the step of forming a first coating can be performed on more surfaces than the step of forming the second coating. Similarly, the exposed surface area on which the first coating is formed can be equal to greater than, or less than, the surface area on which the second coating is formed.

The step of forming a first coating can include two steps. In the first step, the composition that forms the first coating can be applied to the at least one surface of the porous substrate. In the second step, the applied composition that forms the first coating can be cured to form the first coating. In some embodiments, the curing process of the composition can begin before, during, or after application of the composition to the surface. The curing process transforms the composition that forms the first coating into the first coating. Before, during or after the curing process, the polymer absorbs a solvent and becomes the solvent-swollen polymer gel included in the first coating. The composition that forms the first coating can be in a liquid state. The first coating can be in a solid state, such as a gel.

The composition that forms the first coating can be applied using conventional coating and lithographic techniques, for example, immersion coating, spin coating, dipping, spraying, brushing, extrusion, screen-printing, or inkjet printing.

Curing the composition that forms the first coating can include the addition of a curing agent or initiator such as, for example, Component (B) as described below. In some embodiments, the curing process can begin immediately upon addition of the curing agent or initiator. The addition of the curing agent or initiator may not begin the curing process immediately, and can require additional curing steps. In other embodiments, the addition of the curing agent or initiator can begin the curing process immediately, and can also require additional curing steps. The addition of the curing agent or initiator can begin the curing process, but not bring it to a point where there composition is cured to the point of being fully cured, or of being unworkable. Thus, the curing agent or initiator can be added before or during the coating process, and further processing steps can complete the cure to form the first coating.

Curing the composition that forms the first coating can include a variety of methods, including exposing the composition that forms the first coating to ambient temperature, sub-ambient temperature, elevated temperature, moisture, a gas, liquid, vapor, solid, or radiation. In some embodiments, curing the composition can include combination of methods. In some embodiments, the curing can include hydrosilylation-curing, condensation-curing, radiation-curing, peroxide curing, organoborane curing, or cooling.

The composition that forms the first coating includes any composition that can be cured to form a solvent-swollen polymer gel. Herein, several example compositions are described that can be cured and allowed to absorb a solvent component to form a solvent-swollen polymer gel, including an example composition that includes Components (A), (B), (C), and optional components (D), (E), and optionally reaction products thereof or and other additional component. Additionally, herein example compositions are described that include Components (A), (C), and optional Components (B), (D), and (E). One of skill in the art will recognize that any method of forming a solvent-swollen polymer gel, using any suitable composition that can form a solvent-swollen gel, is encompassed by the present invention.

In one embodiment, the composition that forms the first coating can include Component (A), at least one free-radical polymerizable compound; Component (B), at least one organoborane free radical initiator; Component (C), at least one solvent; optional Component (D), at least one organonitrogen-reactive compound; optional Component (E), at least one free radical polymerizable organic co-monomer; or the reaction product(s) of two or more components. When component (A) is at least one free-radical polymerizable compound, Component (B), at least one organoborane free radical initiator, is a required component.

In one embodiment, the composition that forms the first coating can include Component (A), at least one organic polymer; optional Component (B), at least one organoborane free radical initiator; Component (C), at least one solvent; optional Component (D), at least one organonitrogen-reactive compound; optional Component (E), at least one free radical polymerizable organic co-monomer; or the reaction product(s) of two or more components. When Component (A) is at least one organic polymer, Component (B), at least one organoborane free radical initiator, is an optional component.

In one embodiment, the composition that forms the first coating can include Component (A), at least one free-radical polymerizable compound and at least one organic polymer; Component (B), at least one organoborane free radical initiator; Component (C), at least one solvent; optional Component (D), at least one organonitrogen-reactive compound; optional Component (E), at least one free radical polymerizable organic co-monomer; or the reaction product(s) of two or more components.

In some embodiments, the solvent-swollen polymer gel is prepared by a method including polymerizing organopolysiloxanes via free radical polymerization initiated by organoborane free-radical catalysts, in the presence of at least one miscible fluid, e.g. solvent, to form a silicone elastomeric matrix that absorbs the miscible fluid. Thus, the solvent-swollen polymer gel compositions of the invention can be homogenous (e.g. single phase), as the elastomer (e.g. the polymer during or after curing) is swellable or otherwise compatible in the miscible fluid, and the miscible fluid serves to swell the elastomer as it cures, or becomes absorbed by the elastomer as it cures. In some embodiments, the composition includes from about 20% to about 99% (by weight) of one or more miscible fluids, and from about 1% to about 80% (by weight) of elastomer. In some embodiments, the composition includes from about 50% to about 90% (by weight) of one or more miscible fluids and from about 10% to about 50% (by weight) of elastomer. The miscible fluid can be thickened by the resulting elastomeric matrix to form a gel or semi-solid state having a plateau elastic shear modulus (G) in the swollen state that is less than or equal to half the intrinsic plateau elastic shear modulus of the elastomer in its undiluted state (e.g. the solvent-swollen polymer without any absorbed solvent).

In various embodiments, forming the solvent-swollen polymer gel from the composition that forms the first coating can include polymerizing Component (A) in the presence of Component (B), Component (C), optionally oxygen, optionally Component (D), and optionally Component (E) while maintaining a temperature of from about 5° C. to about 95° C.

(alternatively, from about 10° C. to about 35° C.) to form a substantially homogenous silicone elastomeric gel. The gel can be an elastomer that is compatible with and absorbs Component (C). In some embodiments, the gel formed has a plateau elastic shear modulus not greater than one half of the intrinsic plateau elastic shear modulus of the silicone elastomer in its undiluted state (e.g. the solvent-swollen polymer without any absorbed solvent).

In other embodiments, forming the solvent-swollen polymer gel from the composition that forms the first coating can include polymerizing Component (A) in the presence of Component (C), optional component (B), optionally oxygen, optionally Component (D), and optionally Component (E) while maintaining a temperature of from about 5° C. to about 95° C. (alternatively, from about 10° C. to about 35° C.) to form a substantially homogenous gel. The gel can be an elastomer that is compatible with and absorbs Component (C). In some embodiments, the gel formed has a plateau elastic shear modulus not greater than one half of the intrinsic plateau elastic shear modulus of the elastomer in its undiluted state (e.g. the solvent-swollen polymer without any absorbed solvent).

In some embodiments, forming the solvent-swollen polymer gel of the first coating includes (I) forming a reaction mixture including Component (A), Component (C), and optionally, one or more of Component (B), Component (D), or Component (E); (II) optionally agitating the reaction mixture in the presence of oxygen; wherein agitation occurs during combination of the Components, after combination of the Components, or combinations thereof; (III) applying the reaction mixture to the at least one surface of the porous substrate, such that the reaction mixture at least partially fills the pores of the at least one surface of the substrate; and (IV) allowing polymerization to continue until the gel is formed. Step (III) of applying the mixture can be sufficient agitation to include step (II) of agitating. Step (III) of applying the mixture can occur independently of step (II) of agitating. In some embodiments, steps (I) and/or (II) are carried out simultaneously with step (III); e.g. step (I) and optional step (II) can be carried out in the presence of the porous substrate. In other embodiments, step (I) and step (III) can be carried out simultaneously, followed by step (II). One or more of Component (D), or Component (E) can be added separately from Component (A), optional Component (B), and Component (C). In preferred embodiments optional Component (D) can be added prior to polymerization of Component (A) (e.g. as part of the initial reaction mixture); in other embodiments optional Component (D) can be added during polymerization (e.g. during formation of the silicone elastomer); or after polymerization (for example, during formation of the solvent-swollen polymer gel by absorption of Component (C) by the elastomer); or combinations thereof. In some embodiments, optional Component (B) can be added after the mixing of components (A), (C), and optional components (D), (E).

In some embodiments, agitation is continued until the gel composition is formed. In some embodiments, agitation occurs only to initiate the reaction and then is discontinued. In some embodiments, no agitation occurs other than that incidental to applying the reaction mixture. In some embodiments, agitation occurs in the presence of oxygen while maintaining the temperature at from about 5° C. to about 95° C. Thus, temperature can be about 5° C. to about 10° C., 10° C. to 15° C., 15° C. to 20° C., 20° C. to 25° C., 25° C. to 30° C., 30° C. to 35° C., 35° C. to 40° C., 40° C. to 45° C., 45° C. to 50° C., 50° C. to 55° C., 55° C. to 60° C., 60° C. to 65° C., 65° C. to 70° C., 70° C. to 75° C., 75° C. to 80° C., 80° C. to 85° C., 85° C. to 90° C., or about 90° C. to about 95° C., or any combination thereof. In some embodiments, agitation occurs in the presence of oxygen while maintaining the temperature at from about 10° C. to about 35° C. Thus, the temperature can be maintained at about 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., and 35° C., or any combination thereof. In some embodiments, agitation can occur under a partially oxygen-depleted atmosphere, such as under nitrogen or argon sweep. In some embodiments, the reaction temperature is initially maintained at ambient temperature (e.g. between about 16° C. and about 30° C.), then allowed to increase naturally as the reaction proceeds due to the heat of reaction.

In some embodiments, the solvent-swollen polymer gel prepared by the disclosed methods includes the product formed by polymerizing Component (A) in the presence of Component (B), Component (C), optionally oxygen, optionally Component (D), and optionally Component (E). In some embodiments, the solvent-swollen polymer gel can include Component (A), Component (C), optionally oxygen, optionally Component (B), optionally Component (D), and optionally Component (E); or the reaction product(s) of two or more components. Parts of the unpolymerized composition can be present in the first coating if the polymerization is incomplete. When the polymerization has progressed to a degree that the solvent-swollen polymer gel has formed, including when the gel has formed to the extent that subsequent steps can be performed, in some embodiments parts of the unpolymerized composition can still be present in the first coating.

In one example, one or more solvents (C) can be incompletely absorbed during formation of the solvent-swollen polymer gel. In examples with more than one miscible fluid, different proportions or amounts of miscible fluids can be absorbed during the formation of the solvent swollen polymer gel, including all of one or more miscible fluids, and including none of one or more miscible fluids. In some embodiments part or all of incompletely absorbed fluids can be removed prior to, during, or after subsequent steps using any means known to one of skill in the art, including evaporation.

In some embodiments, the composition that forms the first coating is applied once. In other embodiments, the composition that forms the first coating can be applied more than once. The composition that forms the first coating can be applied in different ways each time the composition is applied. In other examples, the composition that forms the first coating can be applied by the same method during each application.

Component (A), Free Radical Polymerizable Compound or Organic Polymer

The first coating or the coating that forms the first coating can include Component (A). Component (A) can include a free-radical polymerizable compound, or an organic polymer. In preferred embodiments, the first coating or the coating that forms the first coating includes Component (A). In other embodiments, the first coating or the coating that forms the first coating does not include Component (A). As described below, the second coating or the coating that forms the second coating can optionally include Component (A). In some embodiments, the second coating or the coating that forms the second coating includes Component (A). In other embodiments, the second coating or the coating that forms the second coating does not include Component (A).

Component (A) can include free-radical polymerizable organic monomers, oligomers, polymers, or combinations thereof. Component (A) can include organopolysiloxanes having free radical polymerizable groups. The organopolysiloxanes can be polymeric or a mixture of oligomers and polymers, and polymeric organopolysiloxanes can either be homopolymeric or heteropolymeric. In addition, the organopolysiloxanes can be linear, branched, hyperbranched or resinous in chemical structure. Component (A) can undergo free radical-catalyzed addition polymerization, and in some aspects, can also undergo co-polymerization and/or cross-linking. For the preparation of both hydrogels and alcogels, Component (A) can be selected from at least one compound that is immiscible with water, water-compatible alcohols, or combinations thereof.

In some embodiments, Component (A) can include at least one free-radical polymerizable compound. Suitable examples of such compounds can include, but are not limited to, 2-ethylhexylacrylate, 2-ethylhexylmethacrylate, methylacrylate, methylmethacrylate, neopentyl glycol diacrylate, neopentyl glycol dimethacrylate, glycidyl acrylate, glycidyl methacrylate, allyl acrylate, allyl methacrylate, stearyl acrylate, tetrahydrofuryl methacrylate, caprolactone acrylate, acrylic acid, methacrylic acid, 2-hydroxyethylacrylate, 2-hydroxyethylmethacrylate, perfluorobutyl acrylate, perfluorobutyl methacrylate, 1H,1H,2H,2H-heptadecafluorodecyl acrylate, 1H,1H,2H,2H-heptadecafluorodecyl methacrylate, tetrahydroperfluoro acrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethylene glycol diacrylate, diethylene glycol dimethacrylate, dipropylene glycol diacrylate, dipropylene glycol dimethacrylate, polyethylene glycol diacrylate, polyethylene glycol acrylate, polyethylene glycol methacrylate, polyethylene glycol dimethacrylate, polypropylene glycol acrylate, polypropylene glycol methacrylate, polypropylene glycol diacrylate, polypropylene glycol dimethacrylate, propylene glycol mono-methacrylate, ethylene glycol mono-methacrylate, N-isopropyl acrylamide, trimethylolpropane triacrylate, trimethylolpropane trimethacrylate, ethoxylated trimethylolpropane triacrylate, ethoxylated trimethylolpropane trimethacrylate, pentaerythritol triacrylate, pentaerythritol trimethacrylate, pentaerythritol tetraacrylate, pentaerythritol tetramethacrylate, methyl-3-butenoate, allyl methyl carbonate, diallyl pyrocarbonate, allyl acetoacetate, diallyl carbonate, diallyl phthalate, dimethyl itaconate, diallyl carbonate, or combinations thereof. Other useful organic compounds include acrylate-tipped polyurethane prepolymers prepared by reacting isocyanate reactive acrylate monomers, oligomers or polymers such as hydroxy acrylates with isocyanate functional prepolymers, (meth)acrylate tipped rubbery oligomers and polymers such as acrylate- or methacrylate-tipped polyisobutylenes, and (meth)acrylate-functionalized natural oil derivatives such as acrylate- or methacrylate-functionalized soybean oil.

Component (A) can contain silicon-bonded reactive groups capable of reacting in the presence or absence of a curing agent or initiator such as Component (B) to form a cured product of Component (A). Examples of silicon-bonded reactive groups include, but are not limited to, —H, alkenyl, alkynyl, —OH, a hydrolysable group, alkenyl ether, acryloyloxyalkyl, substituted acryloyloxyalkyl, and an epoxy-substituted organic group.

In some embodiments, Component (A) includes organopolysiloxanes having at least two free radical polymerizable moieties per molecule, wherein such moieties are monofunctional, multifunctional, or a combination thereof. Thus, Component (A) can be a mixture of organopolysiloxanes differing in their degree of functionality and/or the nature of the free radical polymerizable moieties. The organopolysiloxanes of Component (A) can also vary in consistency from a fluid to a gum. For example, the organopolysiloxane can be a fluid, a solid, or a solid that becomes flowable at an elevated temperature or by the application of shear. In some aspects, the organopolysiloxanes have a viscosity of from about 1 cP to about 5,000,000 cP at 25° C.; alternatively, from about 50 cP to about 500,000 cP at 25° C.; alternatively, from about 100 cP to about 100,000 cP at 25° C.

The organopolysiloxanes of Component (A) can have a glass transition temperature or, upon polymerization or crosslinking, form elastomers that have a glass transition temperature, wherein the resulting silicone composition undergoes marked changes in its viscosity under the temperatures of use. In one example, such compositions are useful for facilitating a step of drying of the gel.

In some embodiments, Component (A) can include free radical polymerizable organopolysiloxanes having formulae selected from:

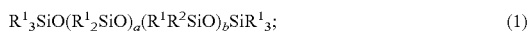
$$R^1{}_3SiO(R^1{}_2SiO)_a(R^1R^2SiO)_bSiR^1{}_3; \quad (1)$$

wherein a has a value of zero to 20,000 and b has a value of 1 to 20,000; and wherein each $R^1$ group is independently a hydrogen, halogen, or a monovalent organic group, and each $R^2$ group is independently a monovalent unsaturated organic group; and

$$R^3{}_2R^4SiO(R^3{}_2SiO)_c(R^3R^4SiO)_dSiR^3{}_2R^4; \quad (2)$$

wherein c has a value of zero to 20,000, and d has a value of zero to 20,000; and wherein each $R^3$ is independently a hydrogen, halogen, or a monovalent organic group, and each $R^4$ group is independently a monovalent unsaturated organic group.

Suitable $R^1$ and $R^3$ groups can include, but are not limited to, hydrogen; organic groups (linear and/or branched) such as alkyl groups, haloalkyl groups, alkenyl groups, alkynyl groups, acrylate functional groups, and methacrylate functional groups; and other organic functional groups such as glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups.

Suitable $R^2$ and $R^4$ groups can include, but are not limited to, monovalent alkenyl and alkynyl groups having 2-12 carbon atoms groups such as vinyl, allyl, butenyl, ethynyl, and propynyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; acrylate functional groups such as acryloyloxypropyl and methacryloyloxypropyl groups; and halogen-substituted analogs thereof. In certain aspects, $R^2$ and $R^4$ are selected from acrylate groups and methacrylate groups.

Some representative examples of Component (A) include, but are not limited to, methacryloxypropyldimethylsiloxy-terminated polydimethylsiloxane; acryloxypropyldimethylsiloxy-terminated polydimethylsiloxane, 1,3-bis(methacryloxypropyl)tetramethyldisiloxane, 1,3-bis(acryloxypropyl)tetramethyldisiloxane, 1,3-bis(methacryloxymethyl)tetramethyldisiloxane, 1,3-bis(acryloxymethyl)tetramethyldisiloxane, α,ω,-methacryloxymethyldimethylsilyl terminated polydimethylsiloxane, methacryloxypropyl-terminated polydimethylsiloxane, α,ω-acryloxymethyldimethylsilyl terminated polydimethylsiloxane, methacryloxypropyldimethylsilyl terminated polydimethylsiloxane, α,ω-acryloxypropyldimethylsilyl terminated polydimethylsiloxane, pendant acrylate and methacrylate functional polymers such as poly(acryloxypropyl-methylsiloxy)polydimethylsiloxane and poly(methacryloxypropyl-methylsiloxy)polydimethylsiloxane copolymers, telechelic polydimethylsiloxanes having multiple acrylate or methacrylate functional groups including those formed via a Michael addition reaction of multi-acrylate or multi-methacrylate monomers to amine-terminated polydimethylsiloxanes, and combinations thereof. Also suitable for use as free radical polymerizable organosilicon compounds include monofunctional acrylate or methacrylate terminated organopolysiloxanes such as polydimethylsiloxane terminated at one end by a methacryloxypropyldimethylsilyl group and terminated at the other end by n-butyldimethylsilyl groups.

In some embodiments, Component (A) can include siloxane resins having structural units of organopolysiloxanes independently selected from:

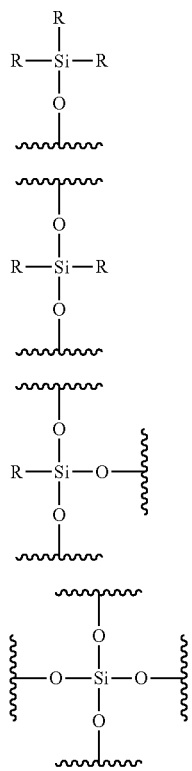

wherein M represents a monofunctional unit $R_3SiO_{1/2}$; D represents a difunctional unit $R_2SiO_{2/2}$; T represents a trifunctional unit $RSiO_{3/2}$; and Q represents a tetrafunctional unit $SiO_{4/2}$, where R represents any suitable functional group.

Siloxane resins can be prepared by any suitable method known in the art. In some aspects, the resin is made by treating a resin copolymer produced by a silica hydrosol capping process with an alkenyl including endblocking reagent. This can include reacting a silica hydrosol under acidic conditions with a hydrolyzable triorganosilane such as trimethylchlorosilane, a siloxane such as hexamethyldisiloxane, and combinations thereof, and then recovering a copolymer having M and Q groups including 2 to 5% wt of hydroxyl groups. The copolymer can be reacted with an endblocking agent including unsaturated organic groups and an endblocking agent free of aliphatic unsaturation in amounts sufficient to provide 3 to 30 mole percent of unsaturated organofunctional M, D or T groups in the resin relative to the sum of all M, D, T and Q units in the resin. Suitable endblocking agents include silazanes, siloxanes, silanes, and combinations thereof.

In some embodiments, Component (A) can include a siloxane resin selected from MQ resins having $R^5{}_3SiO_{1/2}$ units and $SiO_{4/2}$ units; TD resins having $R^5SiO_{3/2}$ units and $R^5{}_2SiO_{2/2}$ units; MT resins having $R_3SiO_{1/2}$ units and $R^5SiO_{3/2}$ units; MTD resins having $R^5{}_3SiO_{1/2}$ units, $R^5SiO_{3/2}$ units, and $R^5{}_2SiO_{2/2}$ units, and combinations thereof; wherein each $R^5$ group is independently a monovalent organic group having from 1-20 carbon atoms. In some examples, $R^5$ has from 1-10 carbon atoms. In some examples, at least one $R^5$ group is a free radical polymerizable unsaturated organic group.

Suitable examples of $R^5$ can include any free-radical polymerizable functional group. For example, examples of $R^5$ can include, but are not limited to monovalent alkenyl and alkynyl groups having 2-12 carbon atoms groups, acrylate groups, cyanofunctional groups, alkyloxypoly(oxyalkyene) groups, epoxy-functional groups, and combinations thereof.

Some examples of suitable siloxane resins that can be used as Component (A) can include, but are not limited to, $M^{Methacryloxymethyl}Q$ resins; $M^{Methacryloxypropyl}Q$ resins; $MT^{Methacryloxymethyl}T$ resins; $MT^{Methacryloxypropyl}T$ resins; $MDT^{Methacryloxymethyl}T^{Phenyl}T$ resins; $MDT^{Methacryloxypropyl}T^{Phenyl}T$ resins; $M^{Vinyl}T^{Phenyl}$ resins; $TT^{Methacryloxymethyl}$ resins; $TT^{Methacryloxypropyl}$ resins; $T^{Phenyl}T^{Methacryloxymethyl}$ resins; $T^{Phenyl}T^{Methacryloxypropyl}$ resins; $TT^{Phenyl}T^{Methacryloxmethyl}$ resins; $TT^{Phenyl}T^{Methacryloxypropyl}$ resins; and combinations thereof.

In some embodiments, Component (A) is selected from acrylate and methacrylate-functional polydimethylsiloxanes and resins, methacryloxypropyldimethylsiloxy-terminated polydimethylsiloxane, methacryloxymethylsiloxy-terminated polydimethylsiloxanes, acryloxypropyldimethylsiloxy-terminated polydimethylsiloxanes, acryloxymethyldimethylsiloxy-terminated polydimethylsiloxanes, polydimethylsiloxane-polymethyl-methacryloxypropylsiloxane copolymers and polydimethylsiloxane-polymethyl-acryloxypropylsiloxane copolymers.

In some embodiments, Component (A) can be selected from methacryloxypropyldimethylsiloxy-terminated polydimethylsiloxanes of varying molecular weights, acrylate-terminated polydimethylsiloxane (e.g. Siltech Silmer Di-50), bis(methacryloxypropyl)tetramethyldisiloxane, and 3-methacryloxypropyl trimethoxysilane.

Component (A) can be selected from at least one water-compatible organic polymer, alcohol-compatible organic polymer, and combinations thereof. The polymer may be homopolymeric, heteropolymeric (including, but not limited to, cross-polymers or co-polymers of any co-monomer distribution), and may be linear, branched, hyperbranched, dendrimeric, or crosslinked to any extent. Examples of suitable polymers include, but are not limited to, gelatin, methylcellulose, hydroxyethyl methyl cellulose, hydroxypropyl methyl cellulose, polyethylene oxide, polyacrylamides, polyacrylic acid, polymethacrylic acid, salts of polyacrylic acid, salts of polymethacrylic acid, poly(2-hydroxyethyl methacrylate), polylactic acid, polyglycolic acid, polyvinylalcohol, polyanhydrides such as poly(methacrylic) anhydride, poly(acrylic) anhydride, polysebacic anhydride, collagen, poly(hyaluronic acid), hyaluronic acid-containing polymers and copolymers, polypeptides, dextran, dextran sulfate, chitosan, chitin, agarose gels, fibrin gels, soy-derived hydrogels and alginate-based hydrogels such as poly(sodium alginate), and combinations thereof.

In some embodiments. Component (A) may be selected from polyacrylic acid, poly(meth)acrylic acid, salts of polyacrylic acid, salts of poly(methacrylic acid), poly(methacrylic) anhydride, and poly(acrylic) anhydride. In some examples, Component (A) can be gelatin, methyl cellulose, Carbopol® ETD 2020, Carbopol® Ultrez 20, or Carbopol® ETD 2050.

In embodiments of the present invention wherein Component (A) is an organic polymer that forms an organic gel or hydrogel, and wherein a free-radical polymerizable compound is not included in the reaction mixture, Component (B), the organoborane free-radical initiator, is optional. One of skill in the art will readily recognize that without a free-radical polymerizable compound, a free-radical initiator is not necessary. Further, without a free-radical polymerizable compound, optional Component (D), the organonitrogen-reactive compound, may also not be necessary. However, in embodiments of the present invention wherein Component (A) is an organic polymer that forms an organic gel or hydrogel, Component (C), the liquid, is still a required component, and a free-radical polymerizable compound, Component (B), Component (D), and Component (E), are all optional compounds.

In the reaction mixture, in embodiments with a free-radical polymerizable Component (A), the free-radical polymerizable compound can be present in, for example, 1 to 90 parts by weight range. In some embodiments, a free-radical polymerizable compound can be present in from 2 to 60 parts by weight, or from 3 to 50 parts by weight, or from 5 to 40 parts by weight. In other embodiments, a free-radical polymerizable compound can be present in from 2 to 75 parts by weight, or from 5 to 50 parts by weight, or from 10 to 30 parts by weight.

In the reaction mixture, in embodiments with an organic polymer Component (A), the organic polymer can be present in, for example, 0.01 to 90 parts by weight range. In some embodiments, an organic polymer can be present in from 0.01 to 80 parts by weight, or from 0.5 to 40 parts by weight, or from 0.1 to 20 parts by weight. In other embodiments, an organic polymer can be present in from 0.5 to 60 parts by weight, or from 1 to 30 parts by weight, or from 3 to 15 parts by weight.

Component (B), Organoborane Free-Radical Initiator

The first coating or the coating that forms the first coating can include optional Component (B). In preferred embodiments, the first coating or the coating that forms the first coating includes Component (B). In other embodiments, the first coating or the coating that forms the first coating does not include Component (B). As described below, the second coating or the coating that forms the second coating can optionally include Component (B). In some embodiments, the second coating or the coating that forms the second coating includes Component (B). In other embodiments, the second coating or the coating that forms the second coating does not include Component (B). In embodiments that include a free-radical polymerizable compound in Component (A) of the coating that forms the first coating, the coating that forms the first coating includes Component (B). In embodiments that include a free-radical polymerizable compound in Component (A) of the coating that forms the second coating, the coating that forms the second coating may include Component (B). In other embodiments that include a free-radical polymerizable compound in Component (A) of the coating that forms the second coating, the coating that forms the second coating does not include Component (B).

Component (B) can include at least one organoborane compound that is capable of generating a free radical and initiating free radical addition polymerization and/or crosslinking. Stabilized organoborane compounds that render the organoborane non-pyrophoric at ambient conditions can be used. In some embodiments, Component (B) can be a complex formed between an organoborane and a suitable organonitrogen (for example, an amine) that renders the complex stable at ambient conditions, wherein a free radical is generated (and polymerization is initialized) upon introduction of an organonitrogen-reactive compound in the presence of oxygen. Component (B) can be an organoborane compound wherein a free radical is generated (and polymerization is initiated) upon heating. Component (B) can be a solvent-stabilized organoborane (for example, a solution of a trialkylborane in THF) where the solvent is allowed to evaporate to liberate the borane and thereby create a radical.

In some embodiments, Component (B) can be an organoborane-organonitrogen complex that can be selected from complexes having the formula:

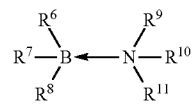

wherein B represents boron and N represents nitrogen; wherein at least one of $R^6$, $R^7$, and $R^8$ contains one or more silicon atoms with the silicon-containing group(s) covalently attached to boron; wherein $R^6$, $R^7$, and $R^8$ are groups that can be independently selected from hydrogen, a cycloalkyl group, a linear or branched alkyl group having 1-12 carbon atoms on the backbone, an alkylaryl group, an organosilane group such as an alkylsilane or an arylsilane group, an organosiloxane group, an alkylene group capable of functioning as a covalent bridge to another boron atom, a divalent organosiloxane group capable of function as a covalent bridge to another boron atom, or halogen substituted homologues thereof; wherein $R^9$, $R^{10}$, and $R^{11}$ are groups that yield an amine compound or a polyamine compound capable of complexing with boron and are independently selected from hydrogen, an alkyl group containing 1-10 carbon atoms, a halogen substituted alkyl group containing 1-10 carbon atoms, or an organosilicon functional group; and wherein at least two of the $R^6$, $R^7$, and $R^8$ groups and at least two of the $R^9$, $R^{10}$, and $R^{11}$ groups can combine to form heterocyclic structures, provided that the sum of the number of atoms from the two combining groups does not exceed 11.

In some embodiments, Component (B) can be selected from alkylborane-organonitrogen complexes that include, but are not limited to, trialkylborane-organonitrogen complexes including trialkylboranes having the formula BR"$_3$, wherein R" represents linear and branched aliphatic or aromatic hydrocarbon groups containing 1-20 carbon atoms. Examples of suitable trialkylboranes include, but are not limited to, trimethylborane, tri-n-butylborane, tri-n-octylborane, tri-sec-butylborane, tridodecylborane, and phenyldiethylborane. In some embodiments, Component (B) can be selected from organosilicon-functional borane-organonitrogen complexes such as those disclosed in WO2006073695A 1.

Examples of suitable organonitrogens for forming organoborane-organonitrogen complexes include, but are not limited to, 1,3 propane diamine; 1,6-hexanediamine; methoxypropylamine; pyridine; isophorone diamine; and silicon-containing amines such as 3-aminopropyltrimethoxysilane, 3-aminopropyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, N-(2-aminoethyl)-3-aminopropyltrimethoxysilane, N-(6-aminohexyl)aminomethyltrimethoxysilane, N-(2-aminoethyl)-h 1-aminoundecyltrimethoxysilane, (aminoethylaminomethyl) pbenethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine.

In some embodiments, nitrogen-containing compounds that can be useful for forming organoborane-organonitrogen complexes can be selected from organopolysiloxanes having least one amine functional group. Examples of suitable amine functional groups include, but are not limited to, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole. Such organopolysiloxanes include, but are not limited to, those having formulas similar to the previously described formulas (1) and (2). Other nitrogen-containing compounds that can be useful for forming the organoborane-organonitrogen complexes of Component (B) include, but are not limited to, N-(3-triethyoxysilylpropyl)-4,5-dihydroimidazole, ureidopropyltriethoxysilane, siloxanes having formulas similar to the previously described formulas (1) and (2), and organopolysiloxane resins in which at least one group is an imidazole, amidine, or ureido functional group.

In some embodiments, nitrogen-containing compounds that may be useful for forming the organoborane-organonitrogen complexes of Component (B) may be selected from organopolysiloxanes having least one amine functional group. Examples of suitable amine functional groups include, but are not limited to, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole. Such organopolysiloxanes include, but are not limited to, those having formulas similar to the previously described formulas (1) and (2). Other nitrogen-containing compounds that may be useful for forming the organoborane-organonitrogen complexes of Component (B) include, but are not limited to, N-(3-triethyoxysilylpropyl)-4,5-dihydroimidazole, ureidopropyltriethoxysilane, siloxanes having formulas similar to the previously described formulas (1) and (2), and organopolysiloxane resins in which at least one group is an imidazole, amidine, or ureido functional group.

In some examples, a free radical is generated by, and polymerization and/or crosslinking is initiated by, heating an organoborane compound (preferably organoborane-organonitrogen complex) or by simply exposing an anaerobically contained alkylborane of Component (B) to air. In some aspects, a free radical is generated by, and polymerization and/or crosslinking is initiated by, heating an organoborane-organonitrogen complex of Component (B), wherein heating causes dissociation of the complex. In some embodiments, a free radical can be generated by, and polymerization and/or crosslinking is initiated by, combining an organonitrogen-reactive compound of Component (D) with an organoborane-organonitrogen complex of Component (B) in an oxygen environment, wherein the combination causes dissociation of the complex. With respect to the latter, a free radical can be generated at temperatures below the dissociation temperature of the organoborane-organonitrogen complex, such as at or below ambient temperature.

Although organonitrogen-stabilized organoborane compounds can be particularly useful as Component (B), one of skill in the art will understand that any organoborane can be used. Examples of alternate stabilized forms of organoboranes encompassed by the present invention include ring stabilized compounds, such as 9-BBN, or solvent complexed organoboranes such as trialkylborane-THF solutions.

In some embodiments, Component (B) can be a trialkylborane-organonitrogen complex wherein the trialkylborane is selected from triethylborane, tri-n-butylborane, tri-n-octylborane, tri-sec-butylborane, and tridodecylborane. In some examples, Component (B) can be selected from triethylborane-propanediamine (TEB-PDA), triethylborane-butylimidazole (TEB-BI), and triethylborane-methoxypropylamine (TEB-MOPA) complexes, and tri-n-butyl methoxypropyl amine.

In some embodiments. Component (B) is selected from tri-n-butyl borane complexed with 3-methoxypropyl amine (TNBB-MOPA) and a triethylborane 1,3-diamino propane complex (TEB-PDA).

In the reaction mixture, Component (B), the organoborane free radical initiator, can be present, for example, from 0.01 to 30 parts by weight range. It is to be understood that the higher end of this range can be particularly useful in cases where the organoborane free radical initiator has a high molecular weight, such as a complex between an aminosiloxane polymer and a trialkylborane. In some embodiments, Component (B) can be present in from 0.01 to 25 parts by weight, or from 0.03 to 20 parts by weight, or from 0.05 to 15 parts by weight. In other embodiments, Component (B) can be present in from 0.01 to 24 parts by weight, or from 0.05 to 12 parts by weight, or from 0.1 to 6 parts by weight.

Component (C), Liquid

The first coating or the coating that forms the first coating can include Component (C). Component (C) is a liquid. In preferred embodiments, the first coating or the coating that forms the first coating includes Component (C). In other embodiments, the first coating or the coating that forms the first coating does not include Component (C). As described below, the second coating or the coating that forms the second coating can optionally include Component (C). In some embodiments, the second coating or the coating that forms the second coating includes Component (C). In other embodiments, the second coating or the coating that forms the second coating does not include Component (C).

Component (C) can include at least one solvent. In some embodiments of the present invention, particularly in compositions that are included in the coating that forms the first coating, component (C) can be a miscible fluid that is sufficiently compatible with the silicone elastomer to cause swelling of the elastomer and corresponding formation of the solvent-swollen polymer gel. In some examples, suitable solvents can be selected from silicones; organic compounds; water; alcohols; and "ecologically-friendly" solvents, such as ionic liquids and supercritical fluids; and mixtures thereof.

Examples of suitable silicones for Component (C) can include, but are not limited to, low molecular weight linear or cyclic volatile silicones; non-volatile alkyl or aryl silicones; and low molecular weight linear or cyclic functional silicones.

One of skill in the art will readily understand that high viscosity oils are less desirable since they are more difficult to remove from the pores in the first coating. In general, a volatile Component (C) in the coating that forms the first or second coating is preferred due to ease of removal. However, less volatile compounds can be included in Component (C).

In some aspects, Component (C) can be selected from organic liquids. Examples include, but are not limited to, any protic, aprotic, or dipolar aprotic organic solvent; aromatic hydrocarbons; aliphatic hydrocarbons; alcohols; aldehydes; ketones; amines; esters; ethers; glycols; glycol ethers; alkyl halides; or aromatic halides. Component (C) can be an oil, including any suitable oil, such as an organic oil, or a silicone oil. Component (C) can include $C_{8-20}$ an isoparaffin.

Examples of Component (C) can include acetonitrile, nitromethane, dimethylformamide, propylene oxide, trioctyl phosphate, butyrolactone, furfural, pine oil, turpentine, and m-creosol; volatile flavoring agents; and other useful flavoring agents including aldehydes and esters; volatile fragrances such as natural products and perfume oils. Component (C) can be a single compound or a mixture of compounds. Additionally, Component (C) can be a mixture of an organic miscible fluid and other miscible fluids, such as a siloxane.

In some embodiments. Component (C) can be an ionic fluid. Examples of suitable ionic fluids can include, but are not limited to, imidazolium derivatives, such as 1-ethyl-3-methylimidazolium tosylate, 1-ethyl-3-methylimidazolium tetrafluoroborate, 1-methyl-3-octylimidazolium chloride, 1-ethenyl-3-ethyl-imidazolium hexafluorophosphate, 1-butyl-3-methylimidazolium hexafluorophosphate; and pyridinium derivatives, such as 1-butyl-4-methylpyridinium chloride, 1-butyl-4-methylpyridiniumn hexafluorophosphate, and 1-butyl-4-methylpyridinium tetrafluoroborate.

In some embodiments, Component (C) can be a supercritical fluid. Examples of suitable supercritical fluids include, but are not limited to, supercritical carbon dioxide, supercritical water, supercritical ethane, supercritical nitrous oxide, supercritical ammonia; supercritical 1,1,1,2-tetrafluoroethane; supercritical difluoromethane; supercritical pentafluoroethane; and mixtures thereof. The solvent strength of supercritical fluids can be modified by any co-solvent such as methanol, ethanol, acetone, hexane, or benzene.

Examples of a suitable Component (C) for the polymerization of radical-polymerizable polydimethylsiloxanes can include, but are not limited to, hexane, cyclohexane, heptane, hexamethyldisiloxane, octamethyltrisiloxane, octamethylcyclotetrasiloxane, decamethylcyclopentasiloxane, decamethyltetrasiloxane, isododecane, isohexadecane, isodecylneopentanoate, isononyl isononanoate, isoparaffin, isoalkane, and capryllylmethyl trisiloxane, toluene, ethyl acetate, 1-ethenyl-3-ethyl-imidazolium hexafluorophosphate, tetrapropyl-ammonium tetracyanoborate, and trimethylsilyl-terminated polydimethylsiloxane fluids having a viscosity of less than 1000 cP at 25° C., or a mixture thereof. In some embodiments, trimethylsilyl-terminated polydimethylsiloxane fluids chosen as Component (C) have a viscosity of from about 0.5 to about 100 cP at 25° C.

In some embodiments, Component (C) can be selected from water, water-miscible alcohols, diols, polyols, and combinations thereof. Examples of suitable alcohols include, but are not limited to, methanol, ethanol, isopropyl alcohol, ethylene glycol, polyethylene glycol, and combinations thereof. In some embodiments Component (C) can be a combination of one or more water-miscible alcohols with water.

In the reaction mixture, Component (C), the liquid, can be present in, for example, 10 to 99.9 parts by weight range. In some embodiments, Component (C) can be present in from 40 to 99.5 parts by weight, or from 45 to 99 parts by weight, or from 49 to 98 parts by weight. In other embodiments. Component (C) can be present in from 40 to 98 parts by weight, or from 60 to 96 parts by weight, or from 74 to 94 parts by weight.

Optional Component (D), Organonitroren-Reactive Compound

The first coating or the coating that forms the first coating can optionally include Component (D). In some embodiments, the first coating or the coating that forms the first coating includes Component (D). In other embodiments, the first coating or the coating that forms the first coating does not include Component (D). As described below, the second coating or the coating that forms the second coating can optionally include Component (D). In some embodiments, the second coating or the coating that forms the second coating includes Component (D). In other embodiments, the second coating or the coating that forms the second coating does not include Component (D).

Optional Component (D) can include at least one organonitrogen-reactive compound that, when combined with the organoborane-organonitrogen complex of Component (B) and optionally exposed to an oxygenated environment such as ambient air, is capable of causing the organoborane-organonitrogen complex to dissociate, thereby initiating free radical polymerization and/or crosslinking. The presence of such an organonitrogen-reactive compound can allow for polymerization and/or crosslinking to occur rapidly at temperatures below the dissociation temperature of the organoborane-organonitrogen complexes of Component (B), including at room temperature and below.

Some examples of suitable organonitrogen-reactive compounds of Component (D) can include, but are not limited to, mineral acids, Lewis acids, carboxylic acids, carboxylic acid derivatives such as anhydrides and succinates, carboxylic acid metal salts, isocyanates, aldehydes, epoxides, acid chlorides, and sulphonyl chlorides, acetic acid, acrylic acid, methacrylic acid, polyacrylic acid, polymethacrylic acid, methacrylic anhydride, undecylenic acid, oleic acid, citric acid, stearic acid, levulinic acid, 2-carboxyethyl acrylate, isophorone diisocyanate monomers or oligomers, methacryloylisocyanate, 2-(methacryloyloxy)ethyl acetoacetate, undecylenic aldehyde, and dodecyl succinic anhydride. In some embodiments, Component (D) can be an organic acid that is also an organonitrogen-reactive compound. Organosilanes or organopolysiloxanes having organonitrogen-reactive groups can be suitable for Component (D). Such compounds can include, but are not limited to, 3-isocyanatopropyltrimethoxysilane; 3-glycidoxypropyltrimethoxysilane; propylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes.

Other suitable organonitrogen-reactive compounds for Component (D) are silicon-containing compounds that, when exposed to moisture, release an acid that causes the organoborane-organonitrogen complex of Component (B) to disassociate. Such compounds can include, but are not limited to, halo silanes, acid anhydride (carboxylic acid) siloxanes, acctoxy siloxanes (such as ethyltriacetoxysiloxane and methyl triacetoxysiloxane), alkyl silicic acids, esters of carboxylic acids and silanols, acid chloride siloxanes.

Further examples of compounds that can be useful for Component (D) are those capable of generating organonitrogen-reactive groups when exposed to ultraviolet radiation, such as iodonium salts containing $[SbF_6]^-$ counterions. With such compounds, it can in some embodiments be useful to also include a photosensitizing compound such as isopropylthioxanthone.

One of skill in the art will recognize that the selection of the organonitrogen-reactive compound for Component (D) will depend upon, among other things, the nature of Component (B). In other examples, Component (D) is selected from acids, anhydrides, isocyanates, epoxides, and aldehydes. In some embodiments, Component (D) is selected from acetic acid, polyacrylic acid, acrylic acid, 2-carboxyethylacrylate, citric acid, and ascorbic acid. In other embodiments, Component (D) is preferably selected from isophorone diisocyanate, carboxyl-terminated polydimethylsiloxanes, polyacrylic acid, acetic acid, hydrochloric acid, and citric acid.

When an organonitrogen-reactive compound is used in the composition that forms the first coating, free radical generation can require the presence of oxygen. In some aspects, merely exposing the organonitrogen-reactive compound or the composition containing the organonitrogen-reactive compound to air is sufficient to induce polymerization. In some aspects, the oxygen dissolved in one or more of the other components of the composition, such as the miscible fluid, can be sufficient. One of skill in the art will understand that limiting the concentration of oxygen, such as imposed by the use of a nitrogen sweep or purge, can be advantageous for safety (reduced flammability of volatile fluids). Limiting oxygen concentration can be advantageous for controlling the reaction efficiency, or for controlling the rate of the reaction. To prevent premature polymerization in the presence of oxygen, Component (B) and Component (D) can be physically or chemically isolated until prior to the desired time to initiate polymerization and/or crosslinking reactions. For example, the composition can be prepared initially as two separate solutions that are combined into one, just prior to the initiation of polymerization and/or crosslinking. The remaining components of the composition can be distributed in any manner between the two solutions, provided that in this example Component (B) and Component (D) do not contact each other. For example, a first solution including Components (A) and (B), and a second solution including components (C) and (D), can be air stable, but can polymerize when the solutions are mixed together in presence of air. Alternatively, components (B) and (D), or both, can be encapsulated or delivered in separate phases. For example, one or both of the Components (B) and (D) can be introduced into the silicone composition in a solid form that prevents their intimate mixing. Polymerization of the composition can be activated by (a) heating it above the softening temperature of the solid phase component or encapsulant, or (b) by the introduction of a solubilizing agent that allows mixing of components (B) and (D). Alternatively, Components (B) and (D) can be combined and packaged anaerobically in a single container, and polymerization can be initiated by introduction of oxygen to the composition.

In some embodiments, an optional organonitrogen-reactive compound is not a component of the composition that forms the first coating. In such cases, free radical polymerization can be initiated by exposing the organoborane compound to air, by thermal activation, via radiation, or by any other method known to one of skill in the art. In the case of thermal activation, the temperature to which the one or more components of the composition must be heated to initiate polymerization is dictated by the nature of the organoborane compound selected as Component (B). For example, if an organoborane-organonitrogen complex is selected as Component (B), the binding energy of the complex will dictate the temperature to which the composition must be heated to initiate dissociation of the complex and polymerization. In some embodiments, Component (B) can be heated prior to its introduction with the other components of the composition. In other aspects, Component (B) and at least one other component are heated prior to the introduction of any remaining components of the composition.

In the reaction mixture, Optional Component (D), the Organonitrogen-Reactive Compound, can be present from 0 to 50 parts by weight range. It is to be understood that the higher end of this range can be particularly useful in cases where the Organonitrogen-Reactive Compound has a high molecular weight, or is also present as Component (A) as in the case of acrylic acid, methacrylic acid, or the polymerized variants of acrylic acid, methacrylic acid and their neutralized or partially neutralized forms. In some embodiments, Component (D) can be present in from 0.05 to 20 parts by weight, or from 0.1 to 10 parts by weight, or from 0.2 to 5 parts by weight. In other embodiments, Component (D) can be present in from 5 to 45 parts by weight, or from 15 to 40 parts by weight, or from 25 to 35 parts by weight.

Optional Component (E), Polymerizable Co-Monomer

The first coating or the coating that forms the first coating can optionally include Component (E). In some embodiments, the first coating or the coating that forms the first coating includes Component (E). In other embodiments, the first coating or the coating that forms the first coating does not include Component (E). As described below, the second coating or the coating that forms the second coating can optionally include Component (E). In some embodiments, the second coating or the coating that forms the second coating includes Component (E). In other embodiments, the second coating or the coating that forms the second coating does not include Component (E).

Component (E) can include at least one organic co-monomer capable of free radical polymerization. In some embodiments, Component (E) can be a free radical polymerizable organic co-monomer having at least one hydrophilic group. Examples of suitable organic compounds include, but are not limited to, any free-radical polymerizable compound listed herein as suitable for use as Component (A). One of skill in the art will recognize that the selection of the organic compound for Component (E) can depend upon, among other things, the nature of Component (A) and the desired use of the resulting product. In some embodiments, Component (E) is selected from acrylates and methacrylates, such as polypropylene glycol monomethacrylate.

In some aspects, Component (E) can be from about 0% to about 50% (by weight) of the silicone composition that forms a coating; alternatively from about 0% to about 30% (by weight) of the silicone composition that forms a coating; alternatively, from about 0% to about 5% (by weight) of the silicone composition that forms a coating.

In the reaction mixture, Optional Component (E), the polymerizable co-monomer, can be present, for example, from 0 to 50 parts by weight range. In some embodiments, Component (E) can be present in from 0.01 to 40 parts by weight, or from 0.05 to 20 parts by weight, or from 0.1 to 10 parts by weight. In other embodiments, Component (E) can be present in from 0.01 to 8 parts by weight, or from 0.05 to 4 parts by weight, or from 0.5 to 2 parts by weight.

Additional Optional Components

The composition that forms the first coating or the first coating can also include additional components. Without limitation, examples of such optional additional components include surfactants, emulsifiers, dispersants, polymeric stabilizers, crosslinking agents, combinations of polymers, crosslinking agents, catalysts useful for providing a secondary polymerization or crosslinking of particles, rheology modifiers, density modifiers, aziridine stabilizers, cure modifiers such as hydroquinone and hindered amines, free-radical initiators, polymers, diluents, acid acceptors, antioxidants, heat stabilizers, flame retardants, scavenging agents, silylating agents, foam stabilizers, solvents, diluents, plasticizers, fillers and inorganic particles, pigments, dyes and dessicants. Liquids can optionally be used. An example of a liquid includes water, an organic solvent, any liquid organic compound, a silicone liquid, organic oils, ionic fluids, and supercritical fluids. Other optional ingredients include polyethers having at least one alkenyl group per molecule, thickening agents, fillers and inorganic particles, stabilizing agents, waxes or wax-like materials, silicones, organofunctional siloxanes, alkylmethylsiloxanes, siloxane resins, silicone gums, silicone carbinol fluids can be optional components, water soluble or water dispersible silicone polyether compositions, silicone rubber, hydrosilylation catalyst inhibitors, adhesion promoters, heat stabilizers, UV stabilizers, and flow control additives.

The composition that forms the first coating can be used neat, or in oil/water, organic solvent/water, water/oil, water/organic solvent, and non-aqueous oil/oil, oil/organic solvent, and organic solvent/oil emulsions or multiple phase emulsions using silicone emulsifiers.

When the composition that forms the first coating is an oil-in-water emulsion, it can include common ingredients generally used for preparing emulsions such as but not limited to non-ionic surfactants well known in the art to prepare oil/water emulsions. Examples of non-ionic surfactants can include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, and polyoxyalkylene glycol modified polysiloxane surfactants.

The composition that forms the first coating can be in the form of aerosols in combination with propellant gases, such as carbon dioxide, nitrogen, nitrous oxide, volatile hydrocarbons such as butane, isobutane, or propane and chlorinated or fluorinated hydrocarbons such as dichlorodifluoromethane and dichlorotetrafluoroethane or dimethylether.

Removing the First Coating

The present invention can include the step of removing the first coating from the at least one surface of the porous substrate. The removal is sufficient to form a substantially exposed substrate surface. The substantially exposed substrate surface has the solvent-swollen polymer gel in the pores. The solvent-swollen polymer gel can be at least partially in the pores.

In one example, the removal can be done by wiping off the first coating, using any method known to one of skill in the art. For example, this can be done with a tissue, cloth, towel, scalpel, or razor blade. In some examples, the removal is conducted by scraping off the first coating. The removal can be conducted by allowing the first coating to dry and then removing the first coating. In other examples, the first coating is not allowed to dry prior to removing the first coating. The first coating can be allowed to partially dry prior to removing the first coating. The first coating can be removed by wiping, scraping, sonication, blowing of air, tapping, vibration, abrasion, adhesive transfer, cryogenic fracture, heating, washing, dissolution with solvent, or by any other method known to one of skill in the art.

The first coating can be removed at any stage of the polymerization of the composition that forms the first coating. For example, the first coating can be removed before polymerization of the composition that forms the first coating. The first coating can be removed at an intermediary point in the polymerization process of the composition that forms the first coating. The first coating can be removed after polymerization of the composition that forms the first coating. The first coating can be removed during any combination of the times described.

The first coating can be removed at any stage of the absorption of the solvent to generate the solvent-swollen polymer gel from the composition that forms the first coating. For example, the first coating can be removed before absorption of the solvent occurs. The first coating can be removed during absorption of the solvent. The first coating can be removed after the absorption of the solvent has completed. In some embodiments, it may not be necessary to remove the first coating from the at least one surface prior to forming a second coating. Examples include embodiments where Coating 2 can be applied in a stable manner over Coating 1, then allowed to collapse onto the surface when the solvent from Coating 1 is removed. In some embodiments Coating 1 is made conformal to the surface, or shrinks to a level beneath the surface, or is formed on a different surface from where Coating 2 will be applied.

Forming a Second Coating

The method can include forming a second coating on the exposed substrate surface. The second coating can include any suitable material known to one of skill in the art, and can be formed by any suitable method known to one of skill in the art. For example, the second coating can include a polymer, a silicate, any form of carbon, a metal, a metal-organic framework, a ceramic, or a combination thereof. The second coating can be amorphous, crystalline or semi-crystalline. The second coating can have any density and can have any porosity. The second coating can have any bulk morphology or surface structure.

The composition that forms the second coating can include any composition that can be cured or cooled to form a polymer, a silicate, any form of carbon, a metal, a metal-organic framework, a ceramic, or that is a polymer, a silicate, any form of carbon, a metal, a metal-organic framework, a ceramic, or any combination thereof. Herein, several examples of the composition that forms the second coating are described via reference to the composition that forms the first coating. One of skill in the art will recognize that any suitable method of forming a coating that includes a polymer or silicate, using any suitable composition that can form a polymer or silicate or that includes a polymer or silicate, is encompassed by the present invention.

The second coating can include a ceramic or silicate. In such embodiments, the second coating and the coating that forms the second coating can include any composition or coating described in the literature, for example, see, *Ceramic Films and Coatings*, Wachtman, J. B., Haber, R. A., Eds., Noyes Publications, 1993, and U.S. Pat. Nos. 6,231,989 and 4,472,510.

Other examples of suitable silicates include, but are not limited to, amorphous and crystalline silicates, aluminosilicates, and zeolites. These silicates can be prepared by any number of known methods such as sol-gel, hydrothermal, chemical vapor deposition and physical deposition techniques. Additionally, the coatings may be made by any process described in the literature, for example, see, U.S. Patent Application Nos. 61/427,238, 61/393,845, U.S. Pat. No. 7,828,875 and references cited therein The second coating can include hybrid polymer-silicate coatings. The second coating and the coating that forms the second coating can include any composition or coating described in the literature, for example, see, U.S. Patent Application Nos. 61/393,845 or 61/427,238.

The second coating can include metal-organic frameworks. The second coating and the coating that forms a metal-organic framework second coating can include any composition or coating described in the literature, for example H. Furukawa et al, *Science* 2010, 329, 424 or J. Y. Lee et al., *Chem. Soc. Rev.* 2009, 38, 1450.

The composition that forms the second coating can include any composition described above for formation of the first coating, or any individual component (e.g. Component (A), Component (B), Component (C), Component (D), Component (E), or additional optional components) or combination of components described above for formation of the first coating; however, preferably, the second coating is not a solvent-swollen coating. Solvents used in the composition that forms the second coating, such as those described as Component (C) in the composition for formation of the first coating, preferably do not substantially absorb into the polymer to form a solvent-swollen coating. Rather, these solvents, if present, are mostly evaporated or consumed (e.g. via chemical reaction) before, during, or after formation of the second coating.

The second coating can include a thermoset or thermoplastic polymer. The thermoplastic or thermoset polymer can be a homopolymer or a copolymer. The thermoplastic or thermoset polymer can be a silicone polymer or an organic polymer.

In one embodiment, the step of forming a second coating can include two steps. In the first step, the composition that forms the second coating can be applied to the exposed substrate surface. In the second step, the applied composition that forms the second coating can be cured to form the second coating. In some embodiments, the curing process of the composition can begin before, during, or after application of the composition to the exposed substrate surface. The curing process transforms the composition that forms the second coating into the second coating. The composition that forms the second coating can be in liquid state. The second coating can be in a solid state.

In another embodiment, the step of forming a second coating can include two steps. In the steps, the second coating can be applied without curing the applied composition. In the first step, the composition that forms the second coating can be applied to the exposed substrate surface. In the second step, the applied composition that forms the second coating can be cooled to form the second coating. In embodiments where curing is not necessary to form the second coating, the composition can be cooled after application to harden it and form the second coating. In embodiments where curing is not necessary, the composition that forms the second coating can include a thermoplastic polymer in a liquid state. For example, the composition can include a thermoplastic polymer in a molten state above the melting point ($T_m$) or glass transition temperature ($T_g$) of the polymer, or the composition can include a thermoplastic polymer and an organic solvent. In embodiments where curing is not necessary, the hardened second coating can be a thermoplastic polymer in a solid state. For some embodiments that require a curing step, the composition that forms the second coating can include a thermoplastic polymer in a molten state and a composition that requires curing, and the second coating can include a thermoplastic polymer in a solid state and a cured composition. Some embodiments of the present invention can include both curing and cooling to transform the composition that forms the second coating into the second coating.

In embodiments where curing is not necessary to form the second coating, and the composition that forms the second coating is a thermoplastic polymer in a molten state, the thermoplastic polymer can be converted to a solid state to form the second coating. This can be accomplished by allowing the composition to cool to a temperature below the liquid-solid transition temperature ($T_g$ or $T_m$), for example, room temperature. When the composition used to form the second coating includes a thermoplastic polymer and an organic solvent, the thermoplastic polymer can be converted to a solid state by removing at least a portion of the solvent. The organic solvent can be removed by allowing the solvent to evaporate at ambient temperature or by heating the coating to a moderate temperature, for example, below the solid-liquid transition temperature of the polymer.

The composition that forms the second coating can be applied using conventional coating and lithographic techniques, for example, immersion coating, spin coating, dipping, spraying, brushing, roll coating, extrusion, screen-printing, or inkjet printing. The amount of the composition can be sufficient to form a polymer or silicate layer having a thickness of from about 0.01 to about 3000 µm, alternatively from about 5 to about 500 µm, alternatively from about 10 to about 100 µm.

In some embodiments, the composition that forms the second coating is applied once. In other embodiments, the composition that forms the second coating can be applied more than once. The composition that forms the second coating can be applied in different ways each time the composition is applied. In other examples, the composition that forms the second coating can be applied by the same method during each application.

Curing the composition that forms the second coating can include the addition of a curing agent or initiator such as those described as Component (B) in the composition for formation of the first coating. In some embodiments, the curing process can begin immediately upon addition of the curing agent or initiator. In other embodiments, the addition of the curing agent or initiator may not begin the curing process immediately, and can require additional curing steps. The addition of the curing agent or initiator can begin the curing process, but not bring it to a point where there composition is cured to the point of being fully cured, or of being unworkable. Thus, the curing agent or initiator can be added before or during the coating process, and further processing steps can complete the cure to form the second coating.

Curing the composition that forms the second coating can include a variety of methods, including exposing the composition that forms the first coating to ambient temperature, elevated temperature, moisture, gas, liquid, vapor, solid or radiation. In some embodiments, curing the composition can include combination of methods. The method used to cure the composition and form the second coating can depend on the composition of the first coating.

Examples of suitable thermoplastic polymers include, but are not limited to thermoplastic silicone polymers such as poly(diphenylsiloxane-co-phenylmethylsiloxane); and thermoplastic organic polymers such as polyolefins, polysulfones, polyacrylates and polyetherimides.

Examples of suitable curable compositions including thermosetting polymers include, but are not limited to, curable silicone compositions, such as hydrosilylation-curable silicone compositions, condensation-curable silicone compositions, and peroxide-curable silicone compositions; curable polyolefin compositions such as polyethylene and polypropylene compositions; curable polyamide compositions; curable epoxy resin compositions; curable amino resin compositions; curable polyurethane compositions; curable polyimide compositions; curable polyester compositions; and curable acrylic resin compositions. Thermosetting polymers can be cured to give thermoset polymers. Examples of suitable thermoset polymers include, but are not limited to, thermoset silicone polymers such as cured silicone elastomers, silicone gels, and cured silicone resins; and thermoset organic polymers such as epoxy resins, cured amino resins, cured polyurethanes, cured polyimides, cured phenolic resins, cured cyanate ester resins, cured bismaleimide resins, cured polyesters, and cured acrylic resins.

A thermoplastic polymer can be a single thermoplastic polymer or a mixture (e.g., blend) including two or more different thermoplastic polymers. For example, a thermoplastic polymer can be a polyolefin blend. The polymers may be present in the form of a composite with various fillers and pigments. Other examples include latex paints and silicone rubber coatings.

In some embodiments, the composition that forms the second coating is applied once. In other embodiments, the composition that forms the second coating can be applied more than once. The composition that forms the second coating can be applied via different methods each time the composition is applied. In other examples, the composition that forms the second coating can be applied by the same method during each application. Of particular usefulness are cases where the second coating is permeable to gases, vapors or liquids with some selectivity, such as in a membrane that allows partial or complete removal of at least one component of a mixture of gases, vapors or liquids. Examples include polymer membranes, silicone membranes, silicate membranes, zeolite membranes, metal membranes, metal organic framework membranes, mixed matrix membranes, microporous carbon membranes and other combinations thereof. Methods of making such coatings as membranes can be found in the literature, for example in *Membrane Technology and Applications*, 2$^{nd}$ Ed., Baker, R. W., John Wiley & Sons, Ltd., 2004 or *Inorganic Membranes for Energy and Fuel Applications*, Bose, A. C., Ed., Springer, 2009, and found references therein Drying the Gel The present invention can include the step of drying the solvent-swollen polymer gel. The solvent-swollen polymer gel that is dried is in the pores of the at least one surface of the porous substrate.

The drying can occur by any suitable method known to one of skill in the art. For example, drying can be conducted by heating or calcination of the coated substrate. In some examples, the temperatures used for drying can include room temperature, or about 30° C. to about 110° C. In cases of where the second coating is cured under high temperature, drying may occur under any conditions used to cure the second coating. In the case of inorganic films, the temperature could be as high as, for example, about 1400° C. Drying can be conducted under vacuum. Drying can occur with a combination of heat and vacuum. In some examples, drying can be conducted in the presence of a desiccant, with optional heating or application of vacuum. The desiccant used can be any desiccant known to one of skill in the art.

After drying, the gel that was solvent-swollen can still contain any amount of absorbed solvent, provided the amount of solvent contained in the gel is less than prior to the drying step. In some embodiments, the dried gel includes little or none of the absorbed solvent. In preferred embodiments, the dried gel can remain in the pores. In other embodiments, the dried gel can be removed from the pores. Removal of the dried gel can occur by any method known to one of skill in the art.

EXAMPLES

The present invention can be better understood by reference to the following examples which are offered by way of illustration. The present invention is not limited to the examples given herein.

Example 1

Method of Making a Solvent-Swollen Polymer Gel

The following procedure was followed (with substitution of materials as listed in Table 1) to create solvent-swollen polymer gels. All steps were completed under ambient laboratory temperature.

1. The following components were mixed for 20 seconds in a Max 20 Speedmixer cup to form Mixture A: 3.53 g of a 4.3 wt % solution of Component (B), TnBB-MOPA (tri-n-butyl borane complexed with 1.3 molar equivalents of 3-methoxypropyl amine) in Component (A), MA-PDMS (methacryloxypropyldimethylsiloxy-terminated polydimethylsiloxane having a number average molecular weight of 8,000 g/mol) and 16.52 g of Component (C), decamethylcyclopentasiloxane (D5).

2. The following materials were mixed for 20 seconds in a second Max 20 Speedmixer cup to form Mixture B: 3.51 g of a 4.3 wt % solution of Component (D) in Component (A), MA-PDMS and 16.61 g of Component (C), decamethylcyclopentasiloxane.

3. 19.41 g of Mixture B were added to 19.19 g of Mixture A in an 8 ounce glass jar containing a magnetic stir bar that was continuously stirred with a magnetic stirrer in a nitrogen purged atmosphere.

4. The material was allowed to continue mixing until the material became too viscous (due to curing) for the stir bar to continue and formed a solvent-swollen polymer gel (solvent-swollen elastomer). This curing happened after approximately 30 minutes.

5. As needed, additional D5 (or substitute miscible fluid) was added to achieve the desired final elastomer content (FEC).

TABLE 1

| Composition | MA-PDMS (g) | TnBB-MOPA (g) | ON-RC | ON-RC (g) | Diluent | Diluent (g) | % IEC | % FEC | APTES (g) | % APTES |
|---|---|---|---|---|---|---|---|---|---|---|
| A | 20.13 | 0.54 | IPDI | 0.43 | NA | 0.00 | 100.0% | 100.0% | | |
| B | 3.34 | 0.09 | IPDI | 0.07 | D5 | 16.55 | 17.5% | 17.5% | | |
| C | 1.41 | 0.04 | IPDI | 0.03 | D5 | 7.03 | 17.4% | 17.4% | | |
| D | 1.81 | 0.05 | IPDI | 0.04 | D5 | 12.67 | 13.0% | 13.0% | | |
| E | 6.47 | 0.14 | IPDI | 0.15 | D5 | 31.84 | 17.5% | 17.5% | | |
| F | 2.17 | 0.05 | IPDI | 0.05 | D5 | 16.10 | 17.5% | 12.4% | | |
| G | 1.02 | 0.02 | IPDI | 0.02 | D5 | 13.94 | 17.5% | 7.1% | | |
| H | 3.39 | 0.08 | Acetic Acid | 0.03 | NA | 0.00 | 100.0% | 100.0% | | |
| I | 9.10 | 0.21 | Acetic Acid | 0.09 | D5 | 9.09 | 50.8% | 50.8% | | |

TABLE 1-continued

| Composition | MA-PDMS (g) | TnBB-MOPA (g) | ON-RC | ON-RC (g) | Diluent | Diluent (g) | % IEC | % FEC | APTES (g) | % APTES |
|---|---|---|---|---|---|---|---|---|---|---|
| J | 3.20 | 0.08 | Acetic Acid | 0.04 | D5 | 15.61 | 17.5% | 17.5% | | |
| K | 2.92 | 0.08 | COOH-PDMS | 0.35 | D5 | 15.83 | 17.4% | 17.4% | | |
| L | 4.66 | 0.11 | Acetic Acid | 0.05 | IDD | 14.40 | 25.1% | 25.1% | | |
| M | 5.21 | 0.12 | IPDI | 0.12 | D5 | 5.45 | 50.0% | 50.0% | | |
| N | 3.18 | 0.07 | IPDI | 0.08 | D5 | 16.42 | 16.8% | 16.8% | | |
| O | 15.53 | 0.35 | Acetic Acid | 0.14 | NA | 0.00 | 100.0% | 100.0% | | |
| P | 0.67 | 0.02 | Acetic Acid | 0.01 | D5 | 3.32 | 17.3% | 17.3% | 0.02 | 0.5% |
| Q | 0.79 | 0.02 | Acetic Acid | 0.01 | D5 | 3.20 | 20.3% | 20.3% | 0.05 | 1.3% |

ON-RC = organonitrogen-reactive compound
IPDI = isophorone diisocyanate
D5 = decamethylcyclopentasiloxane
IDD = isododecane
APTES = 3-aminopropyltriethoxysilane

Example 2

Rheological Testing of Modulus

Modulus measurements of samples were obtained in frequency sweep mode using the parallel plate geometry on a Rheometrics Dynamic Analyzer RDA II rheometer. Moduli reported are dynamic storage moduli (G') at 5% strain and a frequency of 10 rad/s. This value was selected as most representative of the plateau in G' that is associated with elastomeric materials. Sample thicknesses typically ranged between 1-3 mm. Data gathered during the analysis were processed using TA Orchestrator Version V7.1.2.3. All tests were performed at room temperature.

Sample compositions from Example 1 were measured, and the data is shown in Table 2. Comparison of Comp. No. R and Comp. No. A show that approximately 50% or greater reduction in G' can be obtained by diluting a cured sample in additional solvent. Hence, the modulus of the materials of this invention can be adjusted by additional dilution or removal of solvent.

TABLE 2

| Composition | IEC (%) | FEC (%) | Plateau G' (Pa) |
|---|---|---|---|
| A | 100 | 100 | 9.2E+04 |
| B | 17.4 | 17.4 | 8.5E+03 |
| C | 17.4 | 17.4 | 5.4E+03 |
| D | 13.0 | 13.0 | 1.6E+03 |
| M | 50.0 | 50.0 | 3.8E+04 |
| N | 17.5 | 17.5 | 4.5E+03 |
| R | 100.0 | 48.1 | 2.4E+04 |
| S | 17.4 | 12.0 | 2.0E+03 |

Example 3

Solvent-Swollen Polymer Gel Including Hydrophilically Modified Silicone Elastomer The following procedure was followed to create a solvent-swollen polymer gel. All steps were completed under ambient laboratory temperature.

1. Mixture A was prepared by mixing for 20 s in a Max 10 Speedmixer cup: 1.21 g of a 4 wt % solution of TnBB-MOPA in MA-PDMS and 4.81 g D5.

2. Mixture B was prepared by mixing for 20 s in a second Max 10 Speedmixer cup: 1.21 g of a 4 wt % IPDI and 10 wt % solution of polypropylene glycol monomethacrylate in MA-PDMS and 4.80 g D5.

3. 5.61 g of Mixture B were added to 5.69 g of Mixture A in an 8 ounce glass jar containing a magnetic stir bar that was continuously stirred with a magnetic stirrer in a nitrogen purged atmosphere.

4. The material was allowed to continue mixing until the material became too viscous (due to curing) for the stir bar to continue and formed a solvent-swollen polymer gel (solvent-swollen elastomer). This curing happened after approximately 35 minutes.

5. 2.41 g additional D5 was added to 4.51 g of the swollen elastomer to achieve the desired final elastomer content (FEC) of 13%.

Example 4

To a glass jar was added 4 g of a 20 wt % solution of acrylic acid (Aldrich) in deionized water. A porous 316 stainless steel (SS) frit (Applied Porous Technologies, Inc., 25 mm diameter×0.99 mm thickness, and an average pore size of 2 micron) was immersed in the solution. A small Teflon coated magnetic stir bar was introduced to the solution to allow mixing of the solution, and the headspace was purged with a nitrogen gas sweep. To the solution was introduced 0.16 g of an initiator including tri-n-butyl borane complexed with 1.3 molar equivalents of methoxypropyl amine (TnBB-MOPA) which commenced polymerization of the acrylic acid. Within approximately 5 minutes, the solution had polymerized into a hydrogel. The magnetic stir bar was removed and the gel was left overnight in a covered glass jar. The SS frit was then removed from the gel, and excess gel was wiped off with a lint-free laboratory tissue, leaving a hydrogel-impregnated substrate.

Example 5

A coating solution for formation of a second coating was prepared by initiating the polymerization of 2.04 g of an equimolar adduct of methacrylic acid (Aldrich) and 3-aminopropyltriethoxysilane (Aldrich) with 0.09 g TnBB-MOPA initiator (Aldrich), then adding 1.03 g of toluene.

Comparative Example 1

A drop of the coating Solution from Example 5 was placed on the top surface of a bare SS steel frit identical to the one used in Example 4 that was resting in an aluminum weighing dish. The droplet immediately permeated into the substrate. Three more drops were added to the surface with similar results. When the frit was moved laterally on the dish, a trail of liquid that had permeated through the substrate was visible.

Example 6

A drop of the coating solution from Example 5 was placed on the top surface of the hydrogel impregnated substrate prepared in Example 4 that was resting in an aluminum weighing dish. This drop remained on the surface of the frit. Three more drops were added to the surface, forming a pool of liquid supported on the surface of the frit. When the frit was moved laterally on the aluminum dish, no liquid was visible on the dish, confirming that the frit was now rendered temporarily impermeable to the coating solution by the process described in Example 4.

Example 7

The coated fit from Example 6 was placed in a forced air convection oven for 16 h at 150° C. to allow the coating to cure. A solid coating was left behind on the surface of the frit.

Example 8

The coated sample from Example 7 was further subjected to a calcination step at 600° C. for 3 h to dry the solvent-swollen polymer gel, thereby forming a microporous coating. A drop of isopropanol on the surface of the calcined coating. The solvent quickly permeated through the coating and the substrate confirming that the porosity of the frit was restored.

Example 9

The procedure described in Example 4 was used to produce a polyacrylic acid hydrogel impregnated substrate. The hydrogel was then dried by heating in a forced air convection oven for 100° C. for 24 h.

The surface of this substrate was then analyzed by energy dispersive x-ray spectroscopy (EDS) per Example 11 and found to have significantly higher carbon content than the bare SS frit prior to this step.

Example 10a 150.0 g of 3-aminopropyltriethoxysilane was added to a glass jar. The glass jar was then placed in an ice-bath while the content was being agitated with a magnetic stir bar. 58.4 g of methacrylic acid was measured out separately and was added drop-wise to the glass jar over a period of 5 minutes. The mixture was stored under nitrogen.

Example 10

A dip coating solution was made by combining 125.4 g of anhydrous toluene, 122.7 g of the mixture prepared in example 10a, and 2.5 g of TnBB-MOPA. A hydrogel impregnated substrate prepared according to the method of Example 9 (but prior to the drying step) was cleaned to remove excess hydrogel from the surface with a lint-free laboratory wipe then secured onto the vertical travel arm of dip coating apparatus by a stainless steel alligator clip. The substrate was first dipped into the dip coating solution and then withdrawn vertically at a speed of 85 mm/min. The dip-coated article was allowed to cure for 24 hours at 20° C., then dried in a forced air convection oven at 100° C. for 24 h before testing by EDS and XPS.

Example 11

Sample preparation consisted of placing each frit on an SEM sample stub for analysis on the JEOL JSM-6100 scanning electron microscope (SEM) equipped with the Noran Vantage energy dispersive spectroscopy system (EDS). Sample were analyzed without coating as they were conductive and did not require a conductive coating. SEM conditions for EDS were 15 kV, ~15 mm working distance, aperture 1, and 75 second acquisition time at ×1K magnification. (Aperture/beam current combination sufficient to result in an instrument dead time of 25%.) Three spectra were collected for each sample.

TABLE 3

| EDS weight % response for a bare SS frit and Examples 9 and 10 | | | | | | | |
|---|---|---|---|---|---|---|---|
| | C | O | Si | Mo | Cr | Fe | Ni |
| Comparative Example 2 | 17.11 | 5.26 | 1.38 | 3.88 | 16.05 | 50.53 | 5.80 |
| Example 9 | 38.83 | 3.43 | 0.27 | 1.23 | 10.95 | 39.38 | 5.91 |
| Example 10 | 26.37 | 6.13 | 5.12 | 1.4 | 12.02 | 42.5 | 6.46 |

Comparative Example 2

The surface of a bare SS frit identical to the one used in Example 9 was tested by EDS.

Comparative Example 3

The surface of a bare SS frit was coated directly with coating solution of identical composition as in Example 10 by dip coating and curing under the same conditions. The coated sample was tested by EDS and showed very similar metal composition signals as the bare SS frit with less than 1 wt % change in the Fe signal. These results indicate that there was no detectable coating on the surface of the uncoated porous frit.

Example 12

XPS Procedure

XPS data were obtained on a Kratos Analytical AXIS Nova ESCA using a monochromatic Al $K_\alpha$ x-ray source (1486.6 eV) operating at 150 W. A low-energy electron flood was used for surface charge compensation. Each stainless steel sample was mounted on paper on the sample platen and held in place with paper-insulated metal clips to minimize differential charging issues. Each sample was analyzed in three places—roughly ¼ inch from the "left" edge of the sample, in the middle of the sample, and ¼ inch from the "right edge of the sample. The area of analysis was about 0.4 mm×0.9 mm in each case. A low-resolution survey spectrum and high-resolution O 1s, N 1s, C 1s, and Si 2p spectra were obtained at each analysis position.

Example 13

XPS Analysis

The surface of the sample from Example 9 was also analyzed by XPS according to the method of Example 12. XPS results indicate that the surface composition of the frit had significantly higher concentration of elemental carbon (increased from 2.8 to 66.9 at % C) and O—C=O bonds (increased from 1.4 to 13.4 at % C) compared to an untreated SS frit, signifying that the hydrogel did indeed occupy the surface pores of the frit. XPS results also showed that after dip-coating and heat treating the frit of Example 9 according to the method of Example 10, the surface composition had significantly higher elemental N (increased from 2.6 to 7.1 at % N) and Si (increased from 1.5 to 9.2 at %) compared to the frit before dip coating, confirming that the coating was deposited on the surface of the frit.

Example 14

Gelatin-Filled Frit

To 1-L Nalgene beaker was added 20.95 g of gelatin (Jello™ black cherry flavor) and 250 mL near boiling deionized water. A SS fit of the type described in Example 4 was added to the solution. The mixture was allowed to cool to room temperature. Subsequently, the mixture was placed in a freezer at −18° C. for 4 hours. The frit was then removed from the gelled solution, and excess material was wiped off the frit with a paper towel. The frit was then dried in a 100° C. vacuum oven for 24 hours before testing by XPS. XPS surface analysis of the uncoated gelatin-filled frit from Example 14 revealed a higher concentration of elemental N (increased from 3.0 to 8.6 at %) and N—C=O bonds (increased from 4.5 to 10.8 at % C) compared to an un-treat stainless steel frit, indicating that the gelatin was present on the surface of the frit.

Example 15

Gelatin Filled and Coated Frit

A fit prepared according to the process described in Example 14 was dip-coated prior to drying using the method described in example 10. The coated frit was then dried in a 100° C. vacuum oven for 24 hours before testing by XPS. XPS results revealed that surface composition of the coated frit had a significantly higher elemental Si content (increased from 0.9 to 7.0 at %), higher concentration of C—N bonds (increased from 6.6 to 7.3 at % C), and fewer N—C=O bonds (decreased from 10.8 to 7.8 at % C) compared to the uncoated gelatin-filled frit of Example 14, confirming that the coating was deposited on the surface of the frit.

Example 16

To a polypropylene container was added 8.0 g of a decamethylpentacyclosiloxane and 2.1 g of α,ω-methacryloxypropyldimethylsiloxy terminated polydimethylsiloxane (MA-PDMS) having a number average molecular weight of 8,000 g/mol and 0.16 g of glacial acetic acid. A SS frit of the type described in Example 4 was added to the solution resting on a small stainless steel wire spacer to allow the solution to freely access the bottom of the frit. A small Teflon coated magnetic stir bar was introduced to the solution to allow mixing of the solution, and the headspace was purged with a nitrogen gas sweep. To the solution was introduced 0.4 g of TnBB-MOPA which commenced crosslinking of the MA-PDMS. Within approximately 30 minutes, the solution had formed a soft gel. The SS frit was then removed from the gel, and excess gel was wiped off with a lint-free laboratory tissue, leaving a siloxane gel impregnated substrate. A drop of deionized water placed on the siloxane gel impregnated frit with a micropipette was observed to form a high contact angle and remain stable on the surface without penetrating into the pores of the substrate confirming that the pores were effectively sealed for coating by an aqueous medium.

Example 17

Metal-silicon-modified Organic Framework Coordination Polymer $Cu(NO_3)_2 \cdot 3H_2O$ (2.416 g, 10.0 mmol) and $(NH_4)_2SiF_6$ (1.781 g, 10.0 mmol) were dissolved in 30 g of de-ionized water with 10 minutes of sonication. Pyrazine (1.601 g, 20 mmol) was dissolved in ethylene glycol (30.11 g) with 10 minutes of sonication. The ethylene glycol solution was poured over the substrate prepared in example 16 that was resting on the bottom of a glass crystallizing dish. The water solution was then slowly layered on top of the ethylene glycol solution and allowed to react at room temperature to form a coordination polymer. After 1 week at room temperature, the stainless steel frit was removed, and a cluster of blue crystals was observed to be deposited on the surface of the SS frit. A droplet of water was observed to rest on the surface of the frit adjacent to the crystals, showing that the pores of the frit remained blocked to prevent penetration of the reagents, thus confining crystal growth and deposition to the surface of the frit.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed can be resorted to by those skilled in the art, and that such modifications and variations are considered to be within the scope of this invention as defined by the appended claims.

We claim:
1. A method of coating a porous substrate, the method comprising:
   (i) providing a substrate, wherein at least one surface of the substrate comprises a plurality of pores;
   (ii) prior to (iv), forming a first coating on the surface, sufficient to at least partially fill the pores, wherein the first coating comprises a solvent-swollen polymer gel, wherein forming the first coating comprises
   applying a coating to the surface; and
   curing the applied coating to form the solvent-swollen polymer gel, the curing comprising at least one of free-radical polymerization, hydrosilylation-curing, condensation-curing, radiation-curing and peroxide curing;
   (iii) optionally removing the first coating from the surface, sufficient to form a substantially exposed substrate surface with the solvent-swollen polymer gel in the pores;
   (iv) forming a second coating on the exposed substrate surface, wherein the second coating comprises a poly- mer, a silicate, any form of carbon, a metal, a metal-organic framework, a ceramic, or a combination thereof; and (v) after (iv), drying the solvent-swollen polymer gel in the pores.

2. The method of claim 1, wherein the optional of removing the first coating from the surface, sufficient to form a substantially exposed substrate surface with the solvent-swollen polymer gel in the pores, is performed.

3. The method of claim 1, wherein the substrate is a frit.

4. The method of claim 1, wherein the solvent-swollen polymer gel is at least one of a hydrogel, an organogel, an oleogel, and an alcogel.

5. The method of claim 1, wherein applying the coating that forms the first coating comprises at least one of immersion coating, spin coating, dipping, spraying, brushing, roll coating, extrusion, screen-printing, and inkjet printing.

6. The method of claim 1, wherein the coating that forms the first coating comprises:
component (A), a free-radical polymerizable compound or an organic polymer;
optionally, component (B), an organoborane free-radical initiator;
component (C), a solvent;
optionally, component (D), an organonitrogen-reactive compound; and
optionally, component (E), a polymerizable co-monomer;
wherein, when component (A) comprises a free-radical polymerizable compound, component (B) is present.

7. The method of claim 1, wherein the second coating is selectively permeable to at least one gas.

8. The method of claim 1, wherein forming a second coating on the surface comprises forming a second coating that comprises a metal-organic framework.

9. The method of claim 1, wherein forming a second coating on the surface comprises forming a second coating that comprises a ceramic.

10. The method of claim 1, wherein forming a second coating on the surface comprises:
applying a coating that forms the second coating; and
curing the coating that forms the second coating, sufficient to form the second coating.

11. The method of claim 10, wherein the coating that forms the second coating comprises:
component (A), a free-radical polymerizable compound or an organic polymer;
optionally, component (B), an organoborane free-radical initiator;
component (C), a solvent;
optionally, component (D), an organonitrogen-reactive compound; and
optionally, component (E), a polymerizable co-monomer;
wherein, when component (A) comprises a free-radical polymerizable compound, component (B) is present.

12. A method of coating a porous substrate, the method comprising:
(i) providing a substrate, wherein at least one surface of the substrate comprises a plurality of pores;
(ii) prior to (iv), forming a first coating on the surface, sufficient to at least partially fill the pores, wherein the first coating comprises a solvent-swollen polymer gel, wherein forming the first coating on the surface comprises
applying a coating to the surface; and
curing the applied coating to form the solvent-swollen polymer gel, the curing comprising at least one of free-radical polymerization, hydrosilylation-curing, condensation-curing, radiation-curing and peroxide curing;
wherein the coating that forms the solvent-swollen polymer gel comprises
component (A), a free-radical polymerizable compound;
optionally, component (B), an organoborane free-radical initiator;
component (C), a liquid;
optionally, component (D), an organonitrogen-reactive compound; and
optionally, component (E), a polymerizable co-monomer;
wherein, when component (A) is a free-radical polymerizable compound, component (B) is present;
(iii) optionally removing the first coating from the surface, sufficient to form a substantially exposed substrate surface with the solvent-swollen polymer gel in the pores;
(iv) forming a second coating on the exposed substrate surface, wherein the second coating comprises a polymer, a silicate, or a combination thereof, wherein forming the second coating on the exposed surface comprises
applying a coating that forms the second coating; and
curing the coating that forms the second coating, sufficient to form the second coating;
wherein the coating that forms the second coating comprises
component (A) of the coating that forms the second coating, a free-radical polymerizable compound or an organic polymer;
optionally, component (B) of the coating that forms the second coating, an organoborane free-radical initiator;
component (C) of the coating that forms the second coating, a solvent;
optionally, component (D) of the coating that forms the second coating, an organonitrogen-reactive compound; and
optionally, component (E) of the coating that forms the second coating, a polymerizable co-monomer;
wherein, when component (A) of the coating that forms the second coating is a free-radical polymerizable compound, component (B) is present; and
(v) after (iv), drying the solvent-swollen polymer gel in the pores.

13. A method of coating a porous substrate, the method comprising:
(i) providing a substrate, wherein at least one surface of the substrate comprises a plurality of pores;
(ii) prior to (iv), forming a first coating on the surface, sufficient to at least partially fill the pores, wherein the first coating comprises a solvent-swollen polymer gel, wherein forming the first coating on the surface comprises
applying a coating to the surface; and
curing the applied coating to form the solvent-swollen polymer gel, the curing comprising at least one of free-radical polymerization, hydrosilylation-curing, condensation-curing, radiation-curing and peroxide curing;
wherein the coating that forms the solvent-swollen polymer gel comprises
component (A), a free-radical polymerizable compound or an organic polymer;
optionally, component (B), an organoborane free-radical initiator;
component (C), a solvent;

optionally, component (D), an organonitrogen-reactive compound; and optionally, component (E), a polymerizable co-monomer;

wherein, when component (A) comprises a free-radical polymerizable compound, component (B) is present;

(iii) optionally removing the first coating from the surface, sufficient to form a substantially exposed substrate surface with the solvent-swollen polymer gel in the pores;

(iv) forming a second coating on the exposed substrate surface, wherein the second coating comprises a polymer, a silicate, any form of carbon, a metal, a metal-organic framework, a ceramic, or a combination thereof, wherein forming the second coating on the exposed surface comprises applying a coating that forms the second coating; and forming the second coating from the coating that forms the second coating;

wherein the second coating comprises at least one of a ceramic and a metal-organic framework; and (v) after (iv), drying the solvent-swollen polymer gel in the pores.

* * * * *